US012459738B2

(12) United States Patent
Matl et al.

(10) Patent No.: US 12,459,738 B2
(45) Date of Patent: Nov. 4, 2025

(54) SYSTEM AND METHOD FOR A DYNAMIC ROBOTIC KITTING LINE

(71) Applicant: Ambi Robotics, Inc., Emeryville, CA (US)

(72) Inventors: Matthew Matl, El Cerrito, CA (US); David Gealy, Berkeley, CA (US); Jeffrey Mahler, Berkeley, CA (US); Aaron Smith, Suisan City, CA (US); Stephen McKinley, Berkeley, CA (US)

(73) Assignee: Ambi Robotics, Inc., Berkeley, CA (US)

(*) Notice: Subject to any disclaimer, the term of this patent is extended or adjusted under 35 U.S.C. 154(b) by 827 days.

(21) Appl. No.: 17/404,748

(22) Filed: Aug. 17, 2021

(65) Prior Publication Data

US 2022/0048707 A1 Feb. 17, 2022

Related U.S. Application Data

(60) Provisional application No. 63/066,761, filed on Aug. 17, 2020.

(51) Int. Cl.
*B65G 1/137* (2006.01)
*B25J 9/16* (2006.01)
*B65G 47/91* (2006.01)

(52) U.S. Cl.
CPC ......... *B65G 1/1373* (2013.01); *B65G 47/917* (2013.01); *B25J 9/163* (2013.01);
(Continued)

(58) Field of Classification Search
CPC ............... B65G 1/1373; B65G 47/917; B65G 2203/0283; B65G 47/915; B65G 47/918;
(Continued)

(56) References Cited

U.S. PATENT DOCUMENTS 8,997,438 B1  4/2015  Fallas
10,217,074 B1* 2/2019 Stallman .............. B65G 1/1378
(Continued)

FOREIGN PATENT DOCUMENTS

EP  3520973 A1  8/2019
EP  3738719 A1 * 11/2020 .............. B25J 15/04
(Continued)

OTHER PUBLICATIONS

Extended European Search Report for EP Patent Appln. No. 21858981.0 dated Feb. 2, 2024.
(Continued)

*Primary Examiner* — Jacob S. Scott
*Assistant Examiner* — Erin Morris
(74) *Attorney, Agent, or Firm* — Vista IP Law Group, LLP

(57) ABSTRACT

A system and method for a dynamic robot kitting line that can include: processing a set of order requests and setting a packing fulfillment plan process for a robotic kitting line, wherein robotic kitting line comprises a conveyor system, a set of robotic workcells arranged along the conveyor system, and where each robotic workcell includes at least one robotic pick-and-place machine and a set of item bins; and managing operation of the robotic kitting line according to the packing fulfillment plan, which includes: conveying item totes through the set of robotic workcells, and for each item tote, progressively packing items of an order request assigned to an item tote by incrementally packing items at robotic workcells of the set of robotic workcells.

19 Claims, 14 Drawing Sheets

(52) U.S. Cl.
CPC ............ *B25J 9/1653* (2013.01); *B25J 9/1661* (2013.01); *B65G 2203/0283* (2013.01)

(58) Field of Classification Search
CPC ....... B65G 1/1378; B25J 9/163; B25J 9/1653; B25J 9/1661; B25J 9/1679; G05B 2219/45063
See application file for complete search history.

(56) References Cited

U.S. PATENT DOCUMENTS

| | | | | |
|---|---|---|---|---|
| 10,399,778 | B1 * | 9/2019 | Shekhawat | ........... B65G 1/1373 |
| 2012/0165972 | A1 | 6/2012 | Wappling et al. | |
| 2013/0341254 | A1 * | 12/2013 | Bauer | ........................ B07C 5/00 209/552 |
| 2014/0180958 | A1 | 6/2014 | Arunapuram et al. | |
| 2014/0244026 | A1 * | 8/2014 | Neiser | ................... B65G 1/1378 700/216 |
| 2015/0032252 | A1 | 1/2015 | Galluzzo et al. | |
| 2017/0080566 | A1 | 3/2017 | Stubbs et al. | |
| 2017/0336780 | A1 | 11/2017 | Wise et al. | |
| 2018/0148272 | A1 * | 5/2018 | Wagner | ................ B65G 47/902 |
| 2018/0361587 | A1 | 12/2018 | Purrucker et al. | |
| 2019/0062055 | A1 | 2/2019 | Hance et al. | |
| 2019/0369600 | A1 | 12/2019 | Lager | |
| 2020/0094997 | A1 * | 3/2020 | Menon | ..................... B65B 35/54 |
| 2020/0095001 | A1 | 3/2020 | Menon et al. | |
| 2020/0160011 | A1 * | 5/2020 | Wagner | .............. B65G 21/2036 |
| 2020/0223066 | A1 * | 7/2020 | Diankov | ................ B25J 9/1664 |
| 2021/0308874 | A1 | 10/2021 | Gealy et al. | |
| 2021/0308875 | A1 | 10/2021 | Gealy et al. | |

FOREIGN PATENT DOCUMENTS

| | | | | |
|---|---|---|---|---|
| EP | | 4067266 A1 * | 10/2022 | ........... B65G 1/1378 |
| JP | | 2018-144225 | 9/2018 | |
| JP | | 2019-135072 | 8/2019 | |
| JP | | 2020-23022 | 2/2020 | |
| WO | WO 2021/202894 | | 10/2021 | |

OTHER PUBLICATIONS

A. Ali, M. Hosseini, and B. Sahari, "A review of constitutive models for rubber-like materials," American Journal of Engineering and Applied Sciences, vol. 3, No. 1, pp. 232-239, 2010.

N. Correll, K. E. Bekris, D. Berenson, O. Brock, A. Causo, K. Hauser, K. Okada, A. Rodriguez, J. M. Romano, and P. R. Wurman, "Analysis and observations from the first amazon picking challenge," IEEE Transactions on Automation Science and Engineering, 2016.

C. Eppner, S. Hofer, R. Jonschkowski, R. M. Martin, A. Sieverling, V. Wall, and O. Brock, "Lessons from the amazon picking challenge: Four aspects of building robotic systems." in Robotics: Science and Systems, 2016.

C. Hernandez, M. Bharatheesha, W. Ko, H. Gaiser, J. Tan, K. van Deurzen, M. de Vries, B. Van Mil, J. van Egmond, R. Burger, et al., "Team delft's robot winner of the amazon picking challenge 2016," arXiv preprint arXiv: 1610.05514, 2016.

X. Provot et al., "Deformation constraints in a mass-spring model to describe rigid cloth behaviour," in Graphics interface. Canadian Information Processing Society, 1995, pp. 147-14.

H. S. Stuart, M. Bagheri, S. Wang, H. Barnard, A. L. Sheng, M. Jenkins, and M. R. Cutkosky, "Suction helps in a pinch: Improving underwater manipulation with gentle suction flow," in Intelligent Robots and Systems (IROS), 2015 IEEE/RSJ International Conference on. IEEE, 2015, pp. 2279-2284.

B. Bahr, Y. Li, and M. Najafi, "Design and suction cup analysis of a wall climbing robot," Computers & electrical engineering, vol. 22, No. 3, pp. 193-209, 1996.

N. C. Tsourveloudis, R. Kolluru, K. P. Valavanis, and D. Gracanin, "Suction control of a robotic gripper: A neuro-fuzzy approach," Journal of Intelligent & Robotic Systems, vol. 27, No. 3, pp. 215-235, 2000.

A. J. Valencia, R. M. Idrovo, A. D. Sappa, D. P. Guingla, and D. Ochoa, "A 3d vision based approach for optimal grasp of vacuum grippers," in Electronics, Control, Measurement, Signals and their Application to Mechatronics (ECMSM), 2017 IEEE International Workshop of. IEEE, 2017, pp. 1-6.

K.-T. Yu, N. Fazeli, N. Chavan-Dafle, O. Taylor, E. Donlon, G. D. Lankenau, and A. Rodriguez, "A summary of team MIT's approach to the amazon picking challenge 2015," arXiv preprint arXiv: 1604.03639, 2016.

A. Zeng, S. Song, K.-T. Yu, E. Donlon, F. R. Hogan, M. Bauza, D. Ma, O. Taylor, M. Liu, E. Romo, N. Fazeli, F. Alet, N. Chavan-Dafle, R. Holladay, I. Morona, P. Q. Nair, D. Green, I. Taylor, W. Liu, T. A. Funkhouser, A. Rodriguez, "Robotic pick-and-place of novel objects in clutter with multi-affordance grasping and cross-domain image matching", in IEEE International Conference on Robotics and Automation (ICRA).

D. Morrison, A. W. Tow, M. McTaggart, R. Smith, N. Kelly-Boxall, S. Wade-McCue, J. Erskine, R. Grinover, A. Gurman, T. Hunn, D. Lee, A. Milan, T. Pham, G. Rallos, A. Razjigaev, T. Rowntree, K. Vijay, Z. Zhuang, C. Lehnert, I. Reid, P. Corke, J. Leitner, "Cartman: The low-cost cartesian manipulator that won the amazon robotics challenge", in IEEE International Conference on Robotics and Automation (ICRA) (IEEE, 2018), pp. 7757-7764.

R. Kolluru, K. P. Valavanis, and T. M. Hebert, "Modeling, analysis, and performance evaluation of a robotic gripper system for limp material handling," IEEE Transactions on Systems, Man, and Cybernetics, Part B (Cybernetics), vol. 28, No. 3, pp. 480-486, 1998.

G. Mantriota, "Theoretical model of the grasp with vacuum gripper," Mechanism and machine theory, vol. 42, No. 1, pp. 2-17, 2007.

Y. Yoshida and S. Ma, "Design of a wall-climbing robot with passive suction cups," in Robotics and Biomimetics (ROBIO), 2010 IEEE International Conference on. IEEE, 2010, pp. 1513-1518.

"Vacuum End Effectors VEE," Schmalz, The Indicated Copyright Date on Document is May 2018.

U.S. Appl. No. 17/468,220, filed Sep. 7, 2021, David Gealy.

PCT International Search Report and Written Opinion for International Appln. No. PCT/US21/46334, Applicant Magic Leap, Inc., dated Jan. 21, 2022.

Extended European Search Report for EP Patent Appln. No. 21865263.4 dated Feb. 2, 2024.

PCT International Search Report and Written Opinion for International Appln. No. PCT/US21/46334, Applicant Ambi Robotics, Inc., dated Jan. 21, 2022.

PCT International Preliminary Report on Patentability for International Appln. No. PCT/US21/46334, Applicant Ambi Robotics, Inc., dated Feb. 16, 2023.

* cited by examiner

Processing a set of order requests and setting a packing fulfillment plan process for a robotic kitting line S120

Assigning sequencing of item totes conveyed by the conveyor system, where each item tote is assigned an order in the set of order requests S122

Directing distribution of item bins across the set of robotic workcells of the robotic kitting line for progressive packing of item totes S124

Managing operation of the robotic kitting line according to the packing fulfillment plan and a state of robotic kitting line S130

Conveying item totes through the set of robotic workcells S132

Progressively packing items of an order assigned to an item tote through incrementally packing items at robotic workcells of the set of robotic workcells S134

FIGURE 7

SYSTEM AND METHOD FOR A DYNAMIC ROBOTIC KITTING LINE

CROSS-REFERENCE TO RELATED APPLICATIONS

This Application claims the benefit of U.S. Provisional Application No. 63/066,761, filed on 17 Aug. 2020, which is incorporated in its entirety by this reference.

TECHNICAL FIELD

This invention relates generally to the field of automated packing system, and more specifically to a new and useful system and method for a dynamic robotic kitting line.

BACKGROUND

Kitting is a fulfillment process that combines individual items into a single unit for sale. It is a common practice used by ecommerce companies to leverage existing inventory for more sales. Kitting also occurs in contract packaging, medical supply distribution, and food preparation. Traditionally, the process of kitting is achieved using manual labor and is a time and cost-intensive process. Errors are difficult to notice and are costly to remedy.

There has been little in the way of automating kitting using machines or robots because of limitations in today's technology. For example, current robotic solutions face many challenges in handling the large variety of items that are encountered in real-world applications. In particular, there is a significant barrier in automating the kitting process without item-specific training.

Thus, there is a need in the robotic packing field to create a new and useful system and method for a dynamic robotic kitting line. This invention provides such a new and useful system and method.

BRIEF DESCRIPTION OF THE FIGURES

FIG. 7 is a flowchart representation of a variation of the method;

DESCRIPTION OF THE EMBODIMENTS

Figure 1:
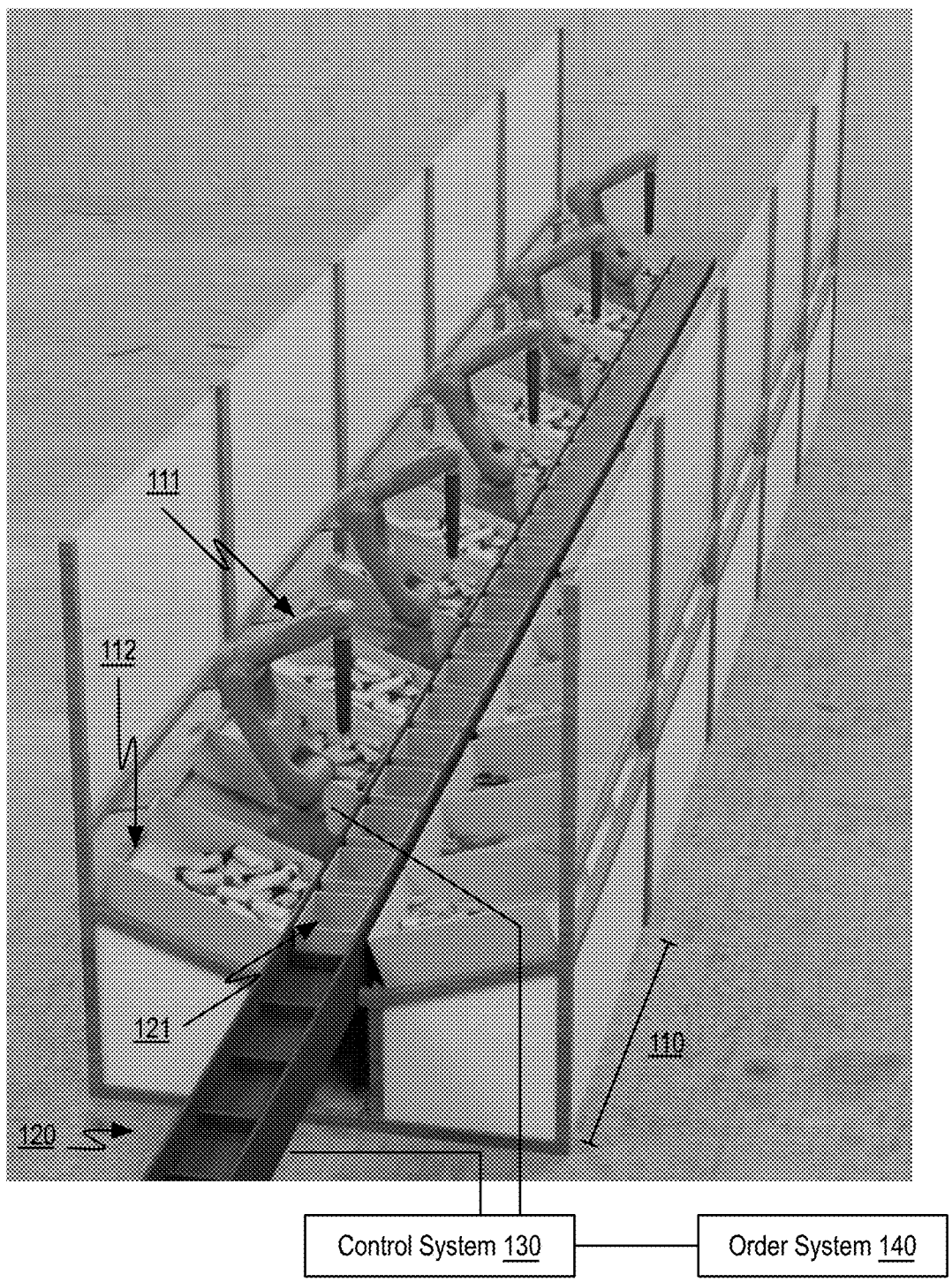
FIGS. 1 and 2 are schematic representations of a system.

The following description of the embodiments of the invention is not intended to limit the invention to these embodiments but rather to enable a person skilled in the art to make and use this invention.

1. Overview

A system and method for a dynamic robotic kitting line functions to enable an automated system to flexibly pack a collection of items when fulfilling multiple orders. The system and method make use of a plurality of robotic workcells organized around one or more conveyor systems, wherein the robotic workcells are operated in concert with the conveyor system to incrementally pack various boxes or totes with appropriate items.

The system and method can integrate with an order system with which digital orders can be translated into system configuration and operations for the orchestration of the robotic kitting line. Such orchestration may include controlling and planning distribution of item types across different bins and robotic workcells, automated or semi-automated loading of items in bins, configured operation of robotic pick-and-place machines, and/or adapting operation in response to monitored packing, item inventory, changes in orders, and/or other factors.

In one variation, the system and method apply this approach to optimizing/enhancing the configuration of an automated robotic kitting system in response to a set of digital order requests (where the order requests can specify quantities and item type for collection). Various techniques may be applied to the translation of order data into specialized configuration and control of a robotic kitting system.

In one variation, the system and method may additionally or alternatively involve the design and operation of an automated robotic kitting system, such as described herein, that is customized for streamlined fulfilling packing orders that can include various quantities of a variety of item types.

The system and method are preferably configurable and able to adapt to a wide variety of requirements. Preferably, the system and method use a modular robotic workcell. The physical modularity of the system and method can enable site-specific solutions to be built to address situations unique to a particular situation. In a first exemplary implementation, robotic workcells can be arranged in series along a single conveyor system. In other exemplary implementations, robotic workcells may be distributed in parallel and/or series across an interconnected circuit/network of conveyor systems.

As one example, the robotic kitting system and method may enable a wide diversity of items to be packed into individual and personalized packages. The system and method may be particularly useful to distribution centers and companies exploring new forms of personalized product delivery. For example, the system and method may be used to enable these entities to offer personalized kits or packages that have individualized sets of products/items.

Related to the variety of items, the planned fulfillment of the orders implemented through the system and method can be based at least in part on the predictive data modeling for robotic pick-and-place handling. For example, planned packing of items can differ depending on if the machine learning models indicate higher confidence or lower confidence in handling the item. For example, grasp planning data modeling (based on computer vision-based analysis of items) may have higher confidence for items with packaging that visually are classified to be easier to grasp compared to an item with visual characteristics where grasping is challenging or where it is unfamiliar. The state of AI or machine learning models as it relates to items in the orders can alter how the system and method plan out distributing items across the various bins.

The system and method may also be used in other areas of order fulfillment including but not limited to applications related to general order fulfillment for one or more items, packing of a limited set of item collections, and/or other scenarios. As one example, the system and method may be implemented within a fulfillment warehouse as a forward pick solution, where commonly ordered items may be added to an existing order using the system and method (either as a last stage, initial, or intermediary stage).

The system and method may provide a number of potential benefits. The system and method are not limited to always providing such benefits, and the potential benefits are presented only as exemplary representations for how the system and method may be put to use. The list of benefits is not intended to be exhaustive and other benefits may additionally or alternatively exist.

As one potential benefit, the system and method can help increase the throughput of a packing and distribution system. The system and method preferably coordinate across a plurality of orders to greatly improve the fulfillment output (e.g., the boxes packed and prepared for shipping). The system and method can achieve such improvements through a variety of approaches such as optimizations on sequence of fulfillment, efficient error recovery, and reduced (or even eliminated) downtime during inventory updates.

As another potential benefit, the system and method can be a modular and scalable technical solution. The system and method can be scalable on a throughput standpoint by expanding the number of robotic workcells and/or the number of kitting lines. In this way, the system and method can be expanded to increase its output. The system and method can also scale in terms of the number of items handled. The system and method can handle a wide range of number of different item types (e.g., different SKUs). More robotic workcells may be added and/or the number of item bins per robotic workcell can be altered to alter the number of item types supported.

As another potential benefit, the system and method may enable zero line-downtime during the operation of the line or at the very least reduce the amount of downtime compared to current implementations. Item replenishment, changes to items and kit configuration can all be performed while the system and method maintains operation for fulfillment of other orders.

As another related potential benefit, the system and method can adapt to a wide variety of items. The robotic kitting systems described herein may handle items with little or no item-specific training thereby enabling the system to be adapted to a wide variety of items and to be used immediately on new items.

As another related potential benefit, the system and method may adapt operation to pick-and-place capabilities of the robotic system as indicated through the AI/machine learning modeling of items in the orders. The system can automatically optimize planning of item packing in ways that are specifically customized to state of the data modeling. For example, commonly handled items with high success rates can be planned for high success picking and may only be stocked item bins in a single robotic workcell. As a counter example, a new/unfamiliar item or a more challenging to grasp item may result in redundant item bins being stocked across multiple robotic workcells to allow for more efficient recovery when an item can't be grasped in (e.g., by having an item be placed in an order if it failed upstream). In a similar way, the unique pick-and-place timing for different items can be factored into the distribution of item bins.

As another potential benefit, the system and method can adapt to current packing and automation equipment. Existing conveyor systems can be repurposed and upgraded to be integrated with one or more robotic workcells. Additionally, the system and method can enable dynamic placement of items.

Herein reference will be made to "items" which characterizes the objects subjected to translation and placement by a robotic system. The items will generally be products but may be any suitable type of object that needs grouped organization (e.g., packing for a shipping order). There will generally be multiple instances of an item of the same item type. Item type may correspond to a stock keeping unit (SKU) identifier or an alternative product identifier.

Herein reference is also made to "item totes" or more shortly "totes", which is used to characterize the receptacle used to hold items once packed. The form factor and variety of the totes can vary greatly, and the system and method may be adapted to different types of totes such as boxes, bins, trays, bags, defined cavities, and the like. In one implementation, totes are placed on a conveyor system and moved through a series of robotic workcells for packing with items. In another implementation, the totes can be defined cavities or containers integrated onto the conveyor system, where items are temporarily placed into the containers of the conveyor system. The containers serving as item totes will generally be emptied (e.g., into a box or bag) after completion of item placement. Reference will generally be made to totes, but alternative item containers may similarly be used.

Herein reference is also made to "item bins", which is used to characterize where items are originally held or stored prior to picking and placing in a tote. The item bins can serve as, at least temporary, holding receptacles for inventory items. As with the totes, the form factor and variety of the item bins can vary greatly and the system and method may be adapted to different types of item bins such as boxes, bins, trays, bags, chutes, defined cavities, and the like. In general, the items will be organized within item bins according to item type. In some cases, an item bin may hold a plurality of different item types. The different item types may be selectively picked from the item bin. In other variations, there may be a plurality of different item types in an item bin, but they may be selected interchangeably. For example, items of the same item type but different colors may be stored in the same item bin such as if color variety is not a selectable option when making an order. Alternatively, such item type varieties may be separated into distinct item bins.

2. System

Figure 2:
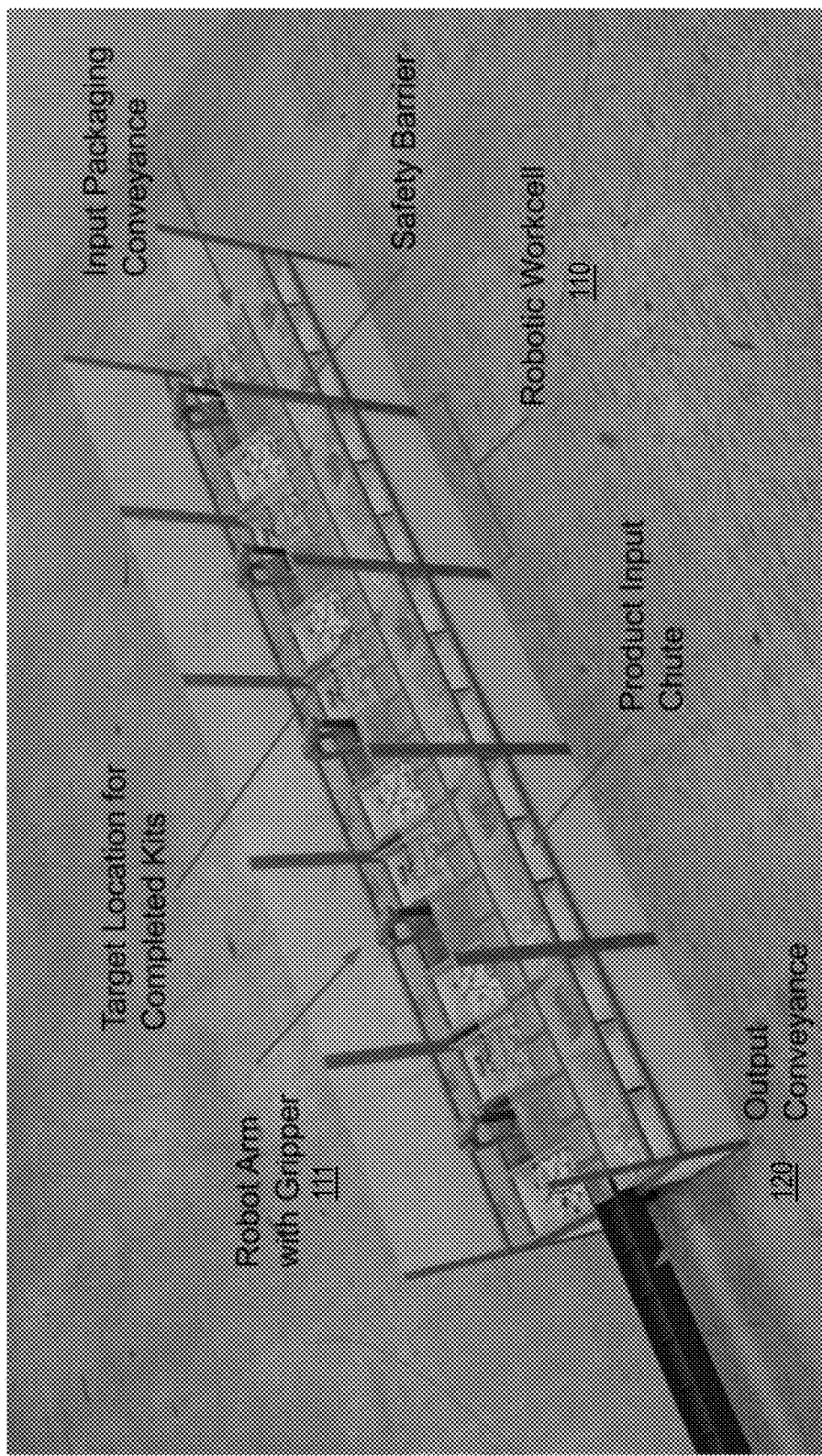

As shown in FIGS. 1 and 2, a system for a dynamic robotic kitting line can include a plurality of robotic workcells 110 arranged in series along a conveyor system 120. The system preferably includes a packing control system 130 that is configured to operate the robotic workcells 110 and the conveyor system 120 in coordination with an order system 140.

Figure 3:
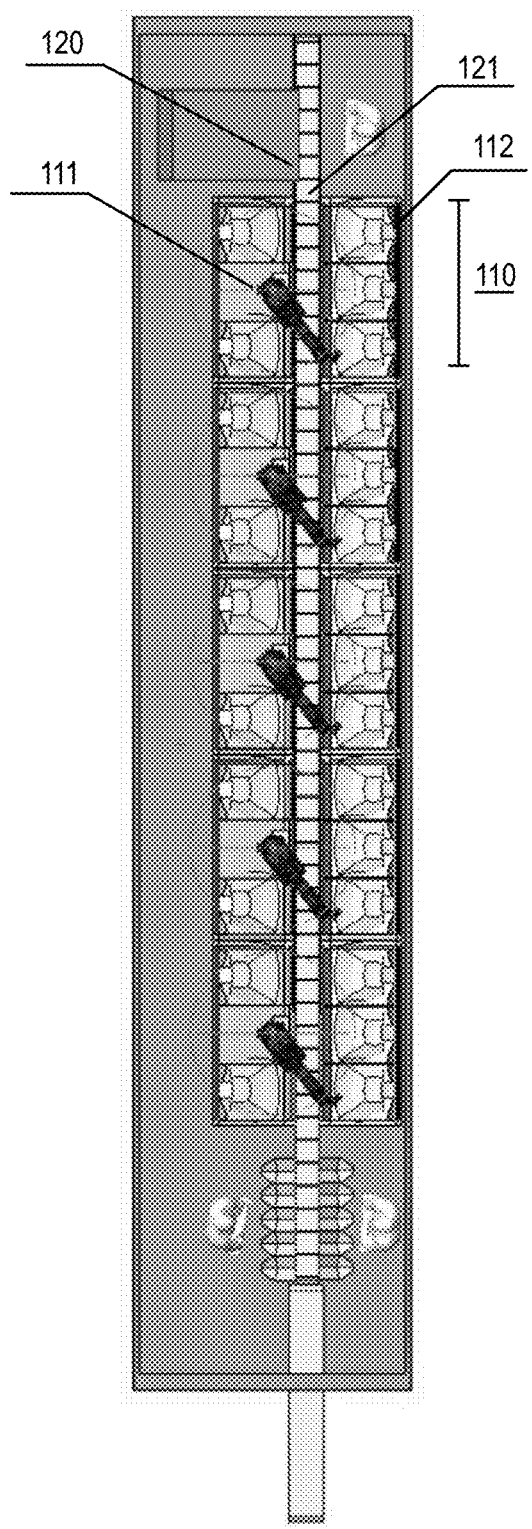
FIG. 3 is a top-down view of an implementation of the system for one conveyor line.
Figure 4:
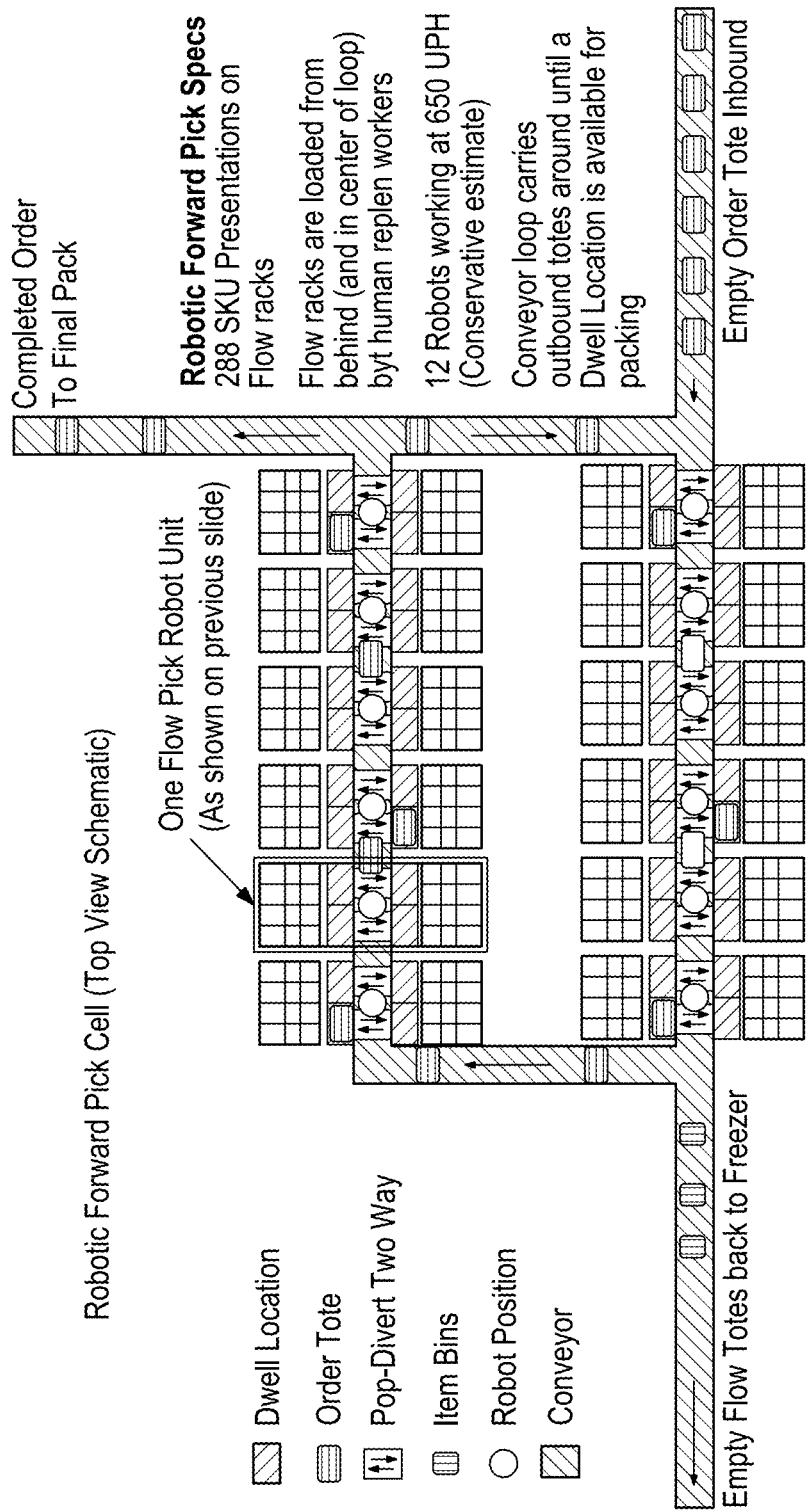
FIG. 4 is a top-down view of an implementation of the system for a complex conveyor system.

The system is described herein primarily as it applies to a single line conveyor system as shown in FIG. 3. However, the system may additionally be adapted to more complex layouts. In particular, the system can be distributed across multiple sections of a conveyor system 120, where items can be redirected to different sections or lines of the conveyor system 120 as shown in FIG. 4. Additionally, robotic transport systems can facilitate transportation of items, item bins, and/or totes between different areas within a packing facility.

As one variation, a system for automated packing of items can include: a conveyor system 120 configured to transport a set of item totes 121 through the conveyor system 120; a set of robotic workcells no aligned in series along at least a portion of the conveyor system 120; wherein each robotic workcell of the set of robotic workcells no comprises a robotic pick-and-place machine 111 and a set of item bins 112, the set of item bins 112 being within a reachable range of the robotic pick-and-place system 111; and a control system 130. The control system 130 can include configuration to: process order requests to set a packing fulfillment plan; (as a result of processing order requests) direct, according to the packing fulfillment plan, loading of item bins at locations across the set of robotic workcells, and manage operation of the set of robotic workcells to fulfill packing of the order requests.

In such a system variation, the item bins 111 may be replaceable and/or refillable to change the type of item stored in an individual item bin and/or the change the positioning along series of robotic workcells 110. An item bin in may be associated and store one or more item types.

In such a system variation, the order requests can be a digital data record of some packing order that specifies a set of items and quantities for collecting together. The items in the set of item bins 112 will generally include at least one item that is a packable item. In some situations, item totes 121 may pass through the system (e.g., down the conveyor system) without having any items added.

Also in such a variation, configuration to manage operation of the set of robotic workcells to fulfill packing of the order requests can involve performing item selection from an item bin from a robotic pick-and-place machine and placement of a selected (i.e., grasped) item into an item tote where this is coordinated with a current item tote in the robotic workcell. With completion of an attempted item placement(s) within a workcell, the configuration can then direct advancing of the conveyor system. In this way, the order associated with a specific item tote is progressively fulfilled as the item tote moves through the conveyor system 1120.

A robotic workcell 110 functions to facilitate picking of items from a limited set of item bins and depositing a picked item into an item tote. The system preferably includes a plurality of robotic workcells 110. The robotic workcells 110 can be arranged in an adjacent serial layout where they are placed side-by-side along a length of a conveyor system 120 as shown in FIG. 1. Alternatively, the plurality of robotic workcells 110 may be spaced separately at different points along a conveyor system 110. In other variations, the robotic workcells 110 may be placed along different portions of a conveyor system network, where at least two subsets of robotic workcells 110 are in parallel.

The robotic workcell 110 preferably includes a robotic pick-and-place machine 111 and a set of item bins 112. There may additionally be a chassis or body frame that functions to provide structural support. The robotic workcell may additionally include shielding and/or other various features.

The robotic pick-and-place machine 111 is preferably positioned so that the conveyor system 120 and one or more item bins 112 are within the reachable range of the robotic pick-and-place machine 111. Being in a reachable range can mean items may be grasped or deposited either directly from a region or indirectly using an indirectly conduit (e.g., a chute or system for conveyance between a receiving region and a depositing region). In one variation, a section of a conveyor system is directly within the reachable range of the robotic pick-and-place machine 111. In another variation, a conduit to the conveyor system 120 such as, a chute or another conveyor system, may be with the reachable range. In this variation, the conduit can transport an item placed by the robotic pick-and-place machine 111 into an item tote.

Figure 5:
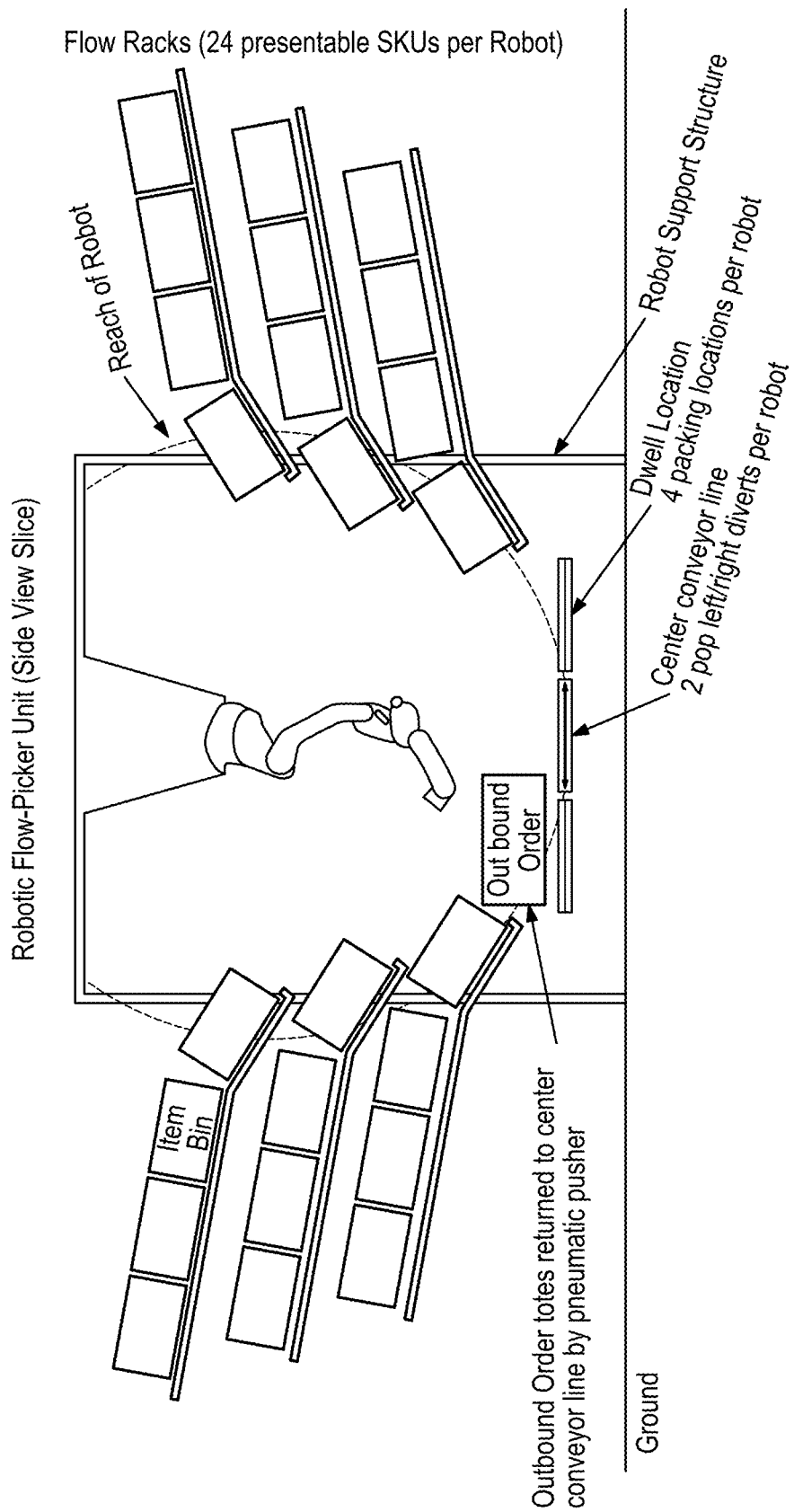
FIG. 5 is a detailed side view of a robotic workcell with a tote hold station.

In one variation, the robotic pick-and-place machine 111 is positioned adjacent to the conveyor system 120 with item bins 112 adjacent to the robotic pick-and-place machine 111 and/or within reachable range on the other side of the conveyor system as shown in FIG. 5.

The robotic pick-and-place machine 111, in one implementation, may be placed such that the item bins 112 are placed in the outer-reachable region of the robotic pick-and-place machine 111 (i.e., the distal-reachable region) and the conveyor system 120 is in the inner reachable region of the robotic pick-and-place machine 111 (i.e., the proximal-reachable region).

The robotic pick-and-place machine 111, in one implementation, may be placed such that the item bins 112 are placed in the inner-reachable region of the robotic pick-and-place machine 111 (i.e., the proximal-reachable region) and the conveyor system 120 is in the outer reachable region of the robotic pick-and-place machine 111 (i.e., the distal-reachable region).

The robotic pick-and-place machine 111 in an alternative implementation may be placed between and adjacent to the item bins 112 and the conveyor system 120.

In one variation, the robotic pick-and-place machine 111 can be suspended above the conveyor system 120 from a structural chassis as shown in FIG. 5. In this variation, the item bins can be positioned on one side and/or the other of the conveyor system 120.

In other variations, there may be multiple robotic pick-and-place machines 111 within one robotic workcell 110. The robotic workcell may alternatively be arranged and positioned in any suitable manner.

The item bins 112 function to be repositories or holding receptacles for items. The item bins 112 of one variation are stationary when positioned within a robotic workcell 110. The item bins 112 may be removable and/or movable. In on variation, movable item bins 112 fit within defined slots, where the slots are situated in a reachable region of the robotic pick-and-place machine 111. They may alternatively be defined containers rigidly set within a robotic workcell 110 where items are added directly to the item bins 112 to replenish inventory. In other variations, an automated mechanical system may facilitate moving and changing position of the item bins 112. For example, a carousel of item bins 112 could be used to facilitate handling of higher numbers of item bins 112.

The item bins 112 may be replaced and/or replenished by removing, moving, and/or exchanging the item bins, which could be performed manually or by an automated system. An item bin 112 may additionally or alternatively be replenished or changed by adding and/or removing items from an item bin 112.

Each robotic workcell preferably includes a plurality of item bins 112 such that each robotic workcell may be used in packing two or more different types of items. The number of item bins may be adjusted based on the type and size of the items packed and/or the size and graspable range of the robotic pick-and-place machines 111. In one exemplary implementation, each robotic workcell 110 may have a set of item bins 112 that includes between 2-8 item bins. For example, However, in some implementations, the system may include one or more workcells that are loaded with one item bin or with only one type of item. Similarly, some situations may call for more than either item bins to be included within a robotic workcell 110.

The set of item bins 112 may be arranged such that slotting or replenishment of the item bins 112 are localized along one exposed surface of the robotic workcell 110. For example, all item bins 112 may be added, removed, and/or stocked from one defined side of the robotic workcell. This exemplary implementation may function to make it convenient for agents (e.g., human workers or stocking robots) to managing adjustments to item bin configuration. In another exemplary implementation, a first subset of item bins 112 may be added, removed, and/or stocked from a first defined side of the robotic workcell 110, and a second subset of item bins 112 may be added, removed, and/or stocked from a second defined side of the robotic workcell 110. For example, there may be eight item bins 112 on right side of a robotic pick-and-place machine and either item bins 112 on the left side of the robotic pick-and-place machine, with the conveyor system 140 running between these two regions of item bins 112.

In one implementation, the robotic workcell 110 includes a stocking user interface that functions to signal changes to state of the item bins 112 in the robotic workcells 110. The stocking user interface is preferably operable on a workcell computing station which is a computing device positioned in association with one or more of the workcells. The stocking user interface may additionally include user input elements such as a button or other control input which can be used by a worker to communicate different stocking statuses (i.e., states) of one or more item bins.

Figure 9:
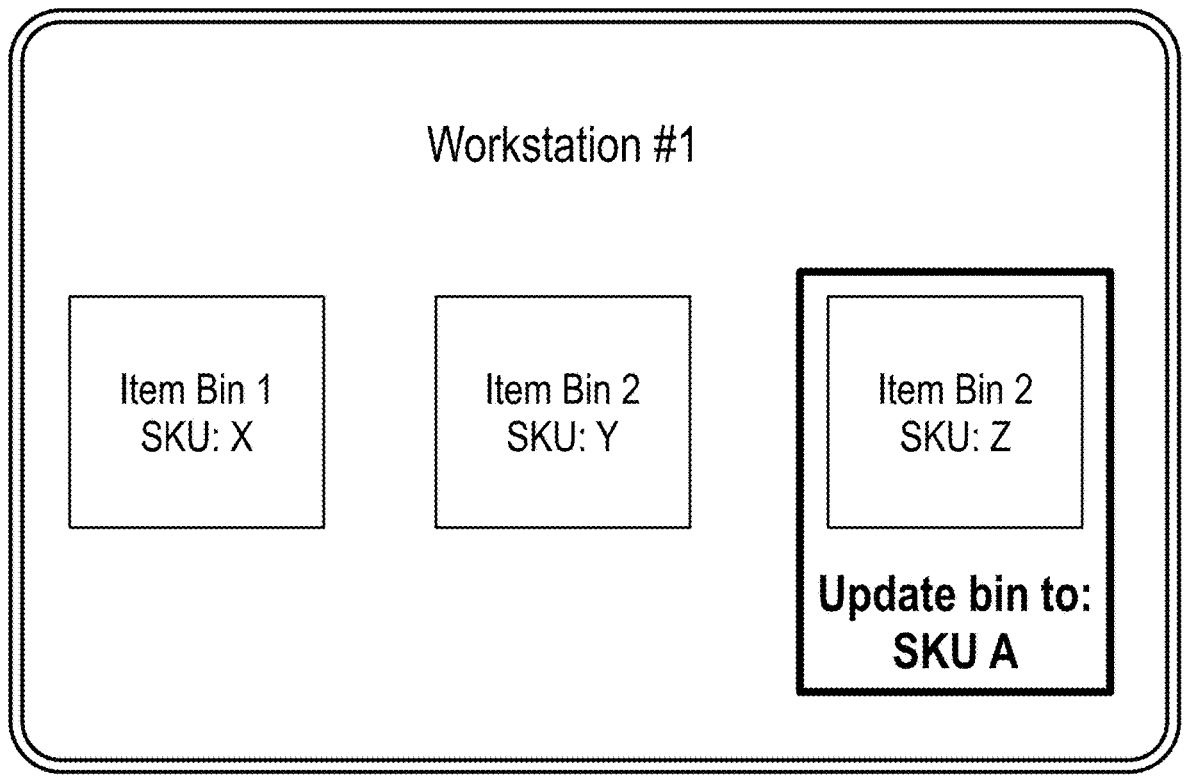
FIG. 9 is a screenshot representation of a stocking user interface directing an update to an item bin.

In one example, a screen displaying instructional graphics signal the stocking status of the bins as shown in FIG. 9. The graphics may communicate if an item bin is in good condition (e.g., no action needed); if an item bin will soon need some attention, if an item needs to be replaced, moved, or replenished, if a slot needs to be filled with an item bin of a particular collection of items.

A worker could monitor the stocking user interface and when action is needed the worker could trigger an input (e.g., a physical button or touch screen button) which halts operation of the robotic system. Alternatively, a light curtain or other proximity sensor could detect when the worker is within proximity to the robotic workcell 110 that would trigger halting operation for safety. There could additionally be protective safety barrier around a robotic workcell 110. In some situations, the robotic workcells 110 could be configured so that a worker is never within a region that would trigger a precautionary deactivation of the robotic pick-and-place machine 111. For example, workers could place item bins 112 in the entrance of a slide such that the item bins 112 slide into the reachable region of the robotic pick-and-place machine 111.

After updating the item bins as requested, the system may sense or detect the change using computer vision, detection of an RFID tag or other identifier, or using another sensing approach. Alternatively, the stocking user interface could include an input mechanism through which a worker could signal that one or more item bins 112 are properly updated.

In practice, a worker or an automated system may have access to a set of item bins 112 and depending on the instructions issued by the packing control system 130 (and potentially communicated through the stocking user interface), the worker or automated system can load the appropriate item bins 112 into the various robotic workcells 110 using the arrangement determined by the packing control system 130.

In one variation, the item bins 112 are a container where items are deposited in an unorganized manner. The item bins 112 may alternatively be an ordered item bin 112 where items are arranged in a regular pattern. An arranged item bin may have a set location for item selection such as at the end of a stack of items.

The robotic pick-and-place machine 111 functions as the automated system used to interact with an item and reposition the item from one spot to another spot. In particular, the robotic pick-and-place machine 111 moves an item stored in an item bin 112 to an item tote 121. However, the robotic pick-and-place machine 110 may additionally facilitate movement of other objects and/or moving items between other locations. For example, the robotic pick and place machine 110 may also be used for repositioning item bins and/or totes.

The robotic pick-and-place machine 111 can be communicatively coupled to the packing control system 130 using a wired or wireless connection.

The robotic pick-and-place machine 111 preferably includes an actuation system and an end effector used to temporarily physically couple (e.g., grasp or attach) to an item and perform some manipulation of that item. The actuation system is used to move the end effector and, when coupled to one or more items, move and orient an item in space. Preferably, the robotic pick-and-place machine 111 is used to pick up an item, manipulate the item (move and/or reorient and item), and then place an item when done. Placement of an item may additionally include orienting and placing the item in a particular position and orientation within the destination (e.g., within a tote such as a box or bag). This position and orientation can be relative to the tote and/or other objects currently in the tote. The robotic pick-and-place machine 111 may additionally facilitate other item related tasks such as scanning a barcode or identifier on the item or performing any suitable task.

Herein, the robotic pick-and-place machine 111 may be more concisely referred to as the robotic system 111. A variety of robotic systems 111 may be used. In one variation, the robotic system includes a robotic pick-and-place machine 1111 that is a robotic articulated arm with an end effector used in item selection. In one preferred implementation, the robotic system 111 is an articulated arm using a pressure-based suction-cup end effector. The robotic system 111 may include a variety of features or designs.

The actuation system functions to translate the end effector through space. The actuation system will preferably move the end effector to various locations for interaction with various items. The actuation system may additionally or alternatively be used in moving the end effector and grasped item(s) along a particular path, orienting the end effector and/or grasped item(s), and/or providing any suitable manipulation of the end effector. In general, the actuation system is used for gross movement of the end effector.

The actuation system may be one of a variety of types of machines used to promote movement of the end effector. In one preferred variation, the actuation system is a robotic articulated arm that includes multiple actuated degrees of freedom coupled through interconnected arm segments. One preferred variation of an actuated robotic arm is a 6-axis robotic arm that includes six degrees of freedom as shown in FIG. 1. The actuation system may alternatively be a robotic arm with fewer degrees of freedom such as a 4-axis or 5-axis robotic arm or ones with additional articulated degrees of freedom such as a 7-axis robotic arm.

In other variations, the actuation system may be any variety of robotic systems in such as a Cartesian robot, a cylindrical robot, a spherical robot, a SCARA robot, a parallel robot such as a delta robot, and/or any other variation of a robotic system in for controlled actuation.

The actuation system may be mounted to a fixed location (e.g., a base of the robotic system 111). The robotic system 111 may alternatively include a locomotion system such as a gantry system, track system (e.g., move along rails), powered wheeled locomotion system, powered leg locomotion system, and/or another type of locomotion system. The locomotion system may function to enable the actuation system to move between different locations.

The actuation system preferably includes an end arm segment. The end arm segment is preferably a rigid structure extending from the last actuated degree of freedom of the actuation system. In an articulated robot arm, the last arm segment couples to the end effector. As described below, the end of the end arm segment can include a head selector that is part of a changeable end effector system.

In one variation, the end arm segment may additionally include or connect to at least one compliant joint, which may improve the grasping and dexterity of the robotic system 111.

The compliant joint functions as at least one additional degree of freedom that is preferably positioned near the end effector. The compliant joint is preferably positioned at the distal end of the end arm segment of the actuation system, wherein the compliant joint can function as a "wrist" joint. The compliant joint preferably provides a supplementary amount of dexterity near where the end effector interacts with an item, which can be useful during various situations when interacting with items.

In a multi-tool changing variation of the system, the compliant joint preferably precedes the head selector component such that each attachable end effector head can be used with controllable compliance. Alternatively, one or more multiple end effectors may have a compliant joint.

In a multi-headed tool variation, a compliant joint may be integrated into a shared attachment point of the multi-headed end effector. In this way use of the connected end effectors can share a common degree of freedom at the compliant joint. Alternatively, one or more multiple end effectors of the multi-headed end effector may include a compliant joint. In this way, each individual end effector can have independent compliance.

The compliant joint is preferably a controllably compliant joint wherein the joint may be selectively made to move in an at least partially compliant manner. When moving in a compliant manner, the compliant joint can preferably actuate in response to external forces. Preferably, the compliant joint has a controllable rotational degree of freedom such that the compliant joint can rotate in response to external forces. The compliant joint can additionally preferably be selectively made to actuate in a controlled manner. In one preferred variation, the controllably compliant joint has one rotational degree of freedom that when engaged in a compliant mode rotates freely (at least within some angular range) and when engaged in a controlled mode can be actuated so as to rotate in a controlled manner. Compliant linear actuation may additionally or alternatively be designed into a compliant joint. The compliant joint may additionally or alternatively be controlled for a variable or partially compliant form of actuation, wherein the compliant joint can be actuated but is compliant to forces above a particular threshold.

The end effector functions to facilitate direct interaction with an item. Preferably, the system is used for grasping an item, wherein grasping describes physically coupling with an item for physical manipulation. Controllable grasping preferably enables the end effector to selectively connect/couple with an item ("grasp" or "pick") and to selectively disconnect/decouple from an item ("drop" or "place"). The end effector may controllably "grasp" an item through suction force, pinching the item, applying a magnetic field, and/or through any suit force. Herein, the system is primarily described for suction-based grasping of the item, but the variations described herein are not necessarily limited to suction-based end effectors.

In one preferred variation, the end effector includes a suction end effector head (which may be more concisely referred to as a suction head) connected to a pressure system. A suction head preferably includes one or more suction cups. The suction cups can come in variety of sizes, stiffnesses, shapes, and other configurations. Some examples of suction head configurations can include a single suction cup configuration, a four suction cup configuration, and/or other variations. The sizes, materials, geometry of the suction heads can also be changed to target different applications. The pressure system will generally include at least one vacuum pump connected to a suction head through one or more hoses.

Figure 10:
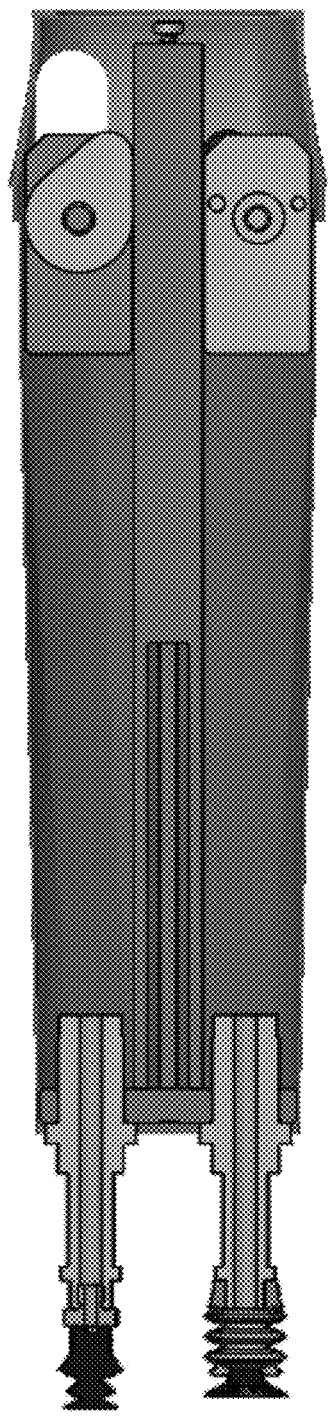
FIG. 10 is a detailed schematic representation of a first variation of the system with multiple selectable end effectors.
Figure 11:
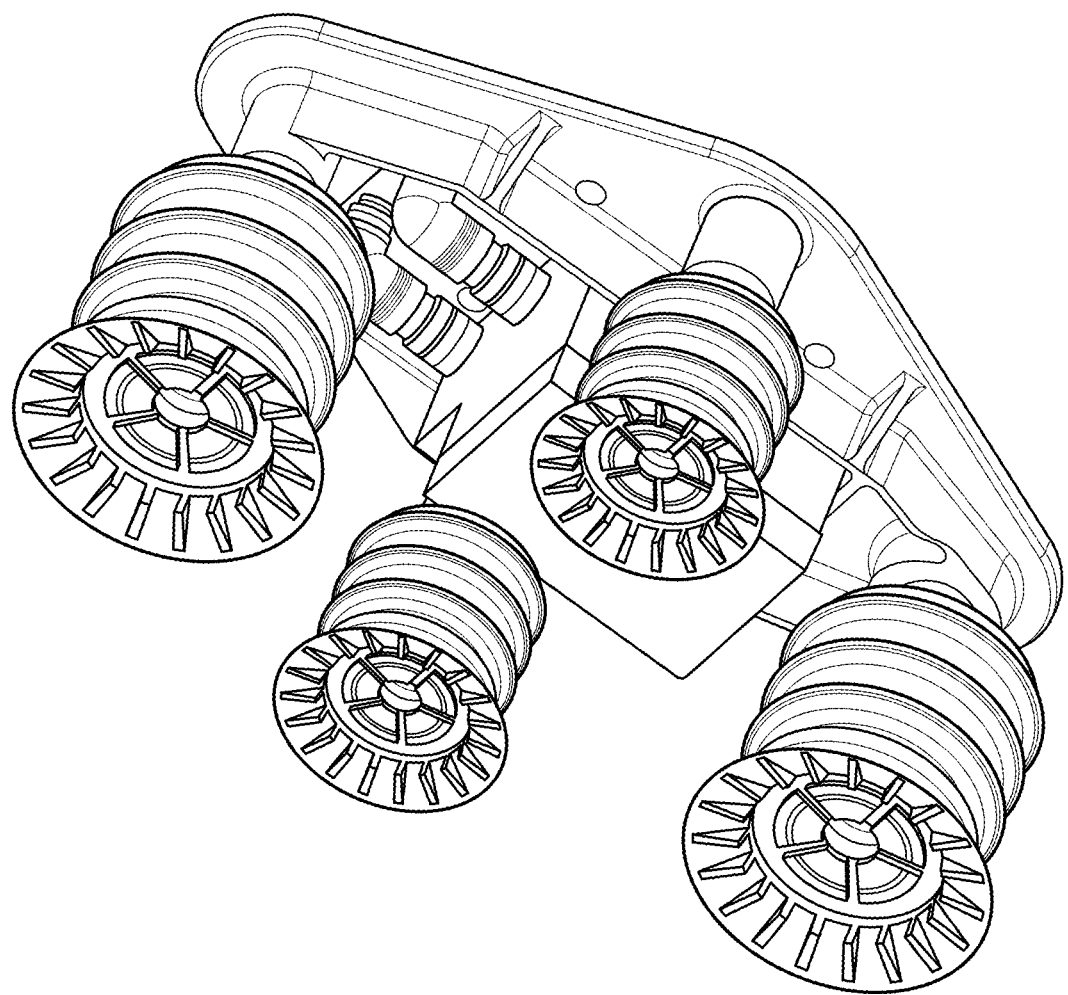
FIG. 11 is a detailed schematic representation of a second variation of the system with multiple selectable end effectors.

In one preferred variation, the end effector of the system includes a multi-headed end effector tool that includes multiple selectable end effector heads as shown in exemplary variations FIG. 10 and FIG. 11. Each end effector head can be connected to individually controlled pressure systems. The system can selectably activate one or multiple pressure systems to grasp using one or multiple end effectors of the multi-headed end effector tool. The end effector heads are preferably selected and used based on dynamic control input from the grasp planning model. The pressure system(s) may alternatively use controllable valves to redirect airflow. The different end effectors are preferably spaced apart. They may be angled in substantially the same direction, but the end effectors may alternatively be directed outwardly in non-parallel directions from the end arm segment.

As shown in the cross-sectional view of FIG. 10, one exemplary variation of a multi-headed end effector tool can be a two-headed gripper. This variation may be specialized to reach within corners of deep bins or containers and pick up small items (e.g., small items like a pencil) as well as larger items (such as boxes). In one variation, each of the gripping head end effectors may be able to slide linearly on a spring mechanism. The end effector heads may be coupled to hoses that connect to the pressure system(s). The hoses can coil helically around the center shaft (to allow for movement) to connect the suction heads to the vacuum generators.

As shown in FIG. 11, another exemplary variation of a multi-headed end effector tool can be a multi four-headed gripper. As shown in this variation, various sensors such as a camera or barcode reader can be integrated into the multi-headed end effector tool, shown here in the palm. Suction cup end effector heads can be selected to have a collectively broad application (e.g., one for small boxes, one for large boxes, one for loose polybags, one for stiffer polybags). The combination of multiple grippers can pick items of different sizes. In some variations, this multi-headed end effector tool may be connected to the robot by a spring plunger to allow for error in positioning.

In another preferred variation of the system, the system can include a changeable end effector system, which functions to enable the end effector to be changed. A changeable end effector system preferably includes a head selector, which is integrated into the distal end of the actuation system (e.g., the end arm segment), a set of end effector heads, and a head holding device. The end effector heads are preferably selected and used based on dynamic control input from the grasp planning model. The head selector and an end effector head preferably attach together at an attachment site of the selector and the head. One or more end effector head can be stored in the head holding device when not in and use. The head holding device can additionally orient the stored end effector heads during storage for easier selection. The head holding device may additionally partially restrict motion of an end effector head in at least one direction to facilitate attachment or detachment from the head selector.

The head selector system functions to selectably attach and detach to a plurality of end effector heads. The end effector head functions as the physical site for engaging with an item. The end effectors can be specifically configured for different situations. In some variations, a head selector system may be used in combination with a multi-headed end effector tool. For example, one or multiple end effector heads may be detachable and changed through the head selector system.

The changeable end effector system may use a variety of designs in enabling the end effectors to be changed. In one variation, the changeable end effector is a passive variation wherein end effector heads are attached and detached to the robotic system 111 without use of a controlled mechanism. In a passive variation, the actuation and/or air pressure control capabilities of the robotic system 111 may be used to engage and disengage different end effector heads. Static magnets, physical fixtures (threads, indexing/alignment structures, friction-fit or snap-fit fixtures) and/or other static mechanism may also be used to temporarily attach an end effector head and a head selector.

In another variation, the changeable end effector is an active system that uses some activated mechanism (e.g., mechanical, electromechanical, electromagnetic, etc.) to engage and disengage with a selected end effector head. Herein, a passive variation is primarily used in the description, but the variations of the system and method may similarly be used with an active or alternative variation.

Figure 12:
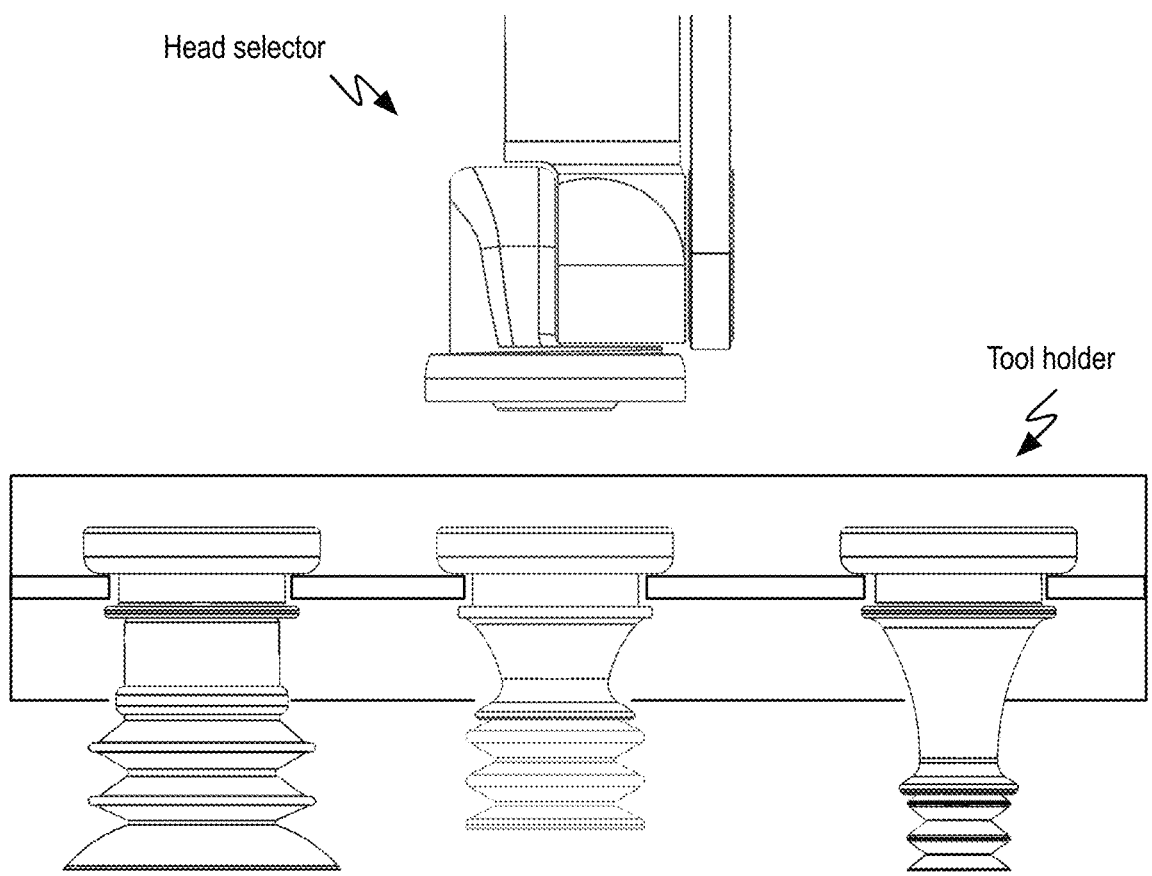
FIG. 12 is a detailed schematic representation of a changeable end effector system.

One preferred variation of the changeable end effector system is designed for use with a robotic system 111 using a pressure system with suction head end effectors. The head selector can further function to channel the pressure to the end effector head. The head selector can include a defined internal through-hole so that the pressure system is coupled to the end effector head. The end effector heads will generally be suction heads. A set of suction end effector heads can have a variety of designs as shown in FIG. 12.

The head selector and/or the end effector heads may include a seal element circumscribing the defined through-hole. The seal can enable the pressure system to reinforce the attachment of the head selector and an end effector head. This force will be activated when the end effector is used to pick up an item and should help the end effector head stay attached when loaded with an outside item.

The robotic system 111 preferably includes a grasp planning and control system to manage the robotic control of the robotic system 111.

The conveyor system 120 functions to move a tote past multiple robotic workcells 110 for selective placement of items into the tote. The conveyor system 120 may be any suitable controlled machine that moves items along a path. The conveyor system 120 preferably moves items primarily in one direction. Herein downstream is used to refer to the primary direction of tote flow from one end of the robotic kitting line towards an exit. Upstream would refer to the direction opposite of downstream (i.e., upstream is the direction along the conveyor system 120 from the exit towards the source of the totes).

The conveyor system 120 preferably transports a single line of item totes. The conveyor system 120 may alternatively have multiple item totes within a reachable region of a robotic system 111 at one time. In one variation, the conveyor system 120 may be wide enough to have two or more totes arranged side-by-side.

Figure 13:
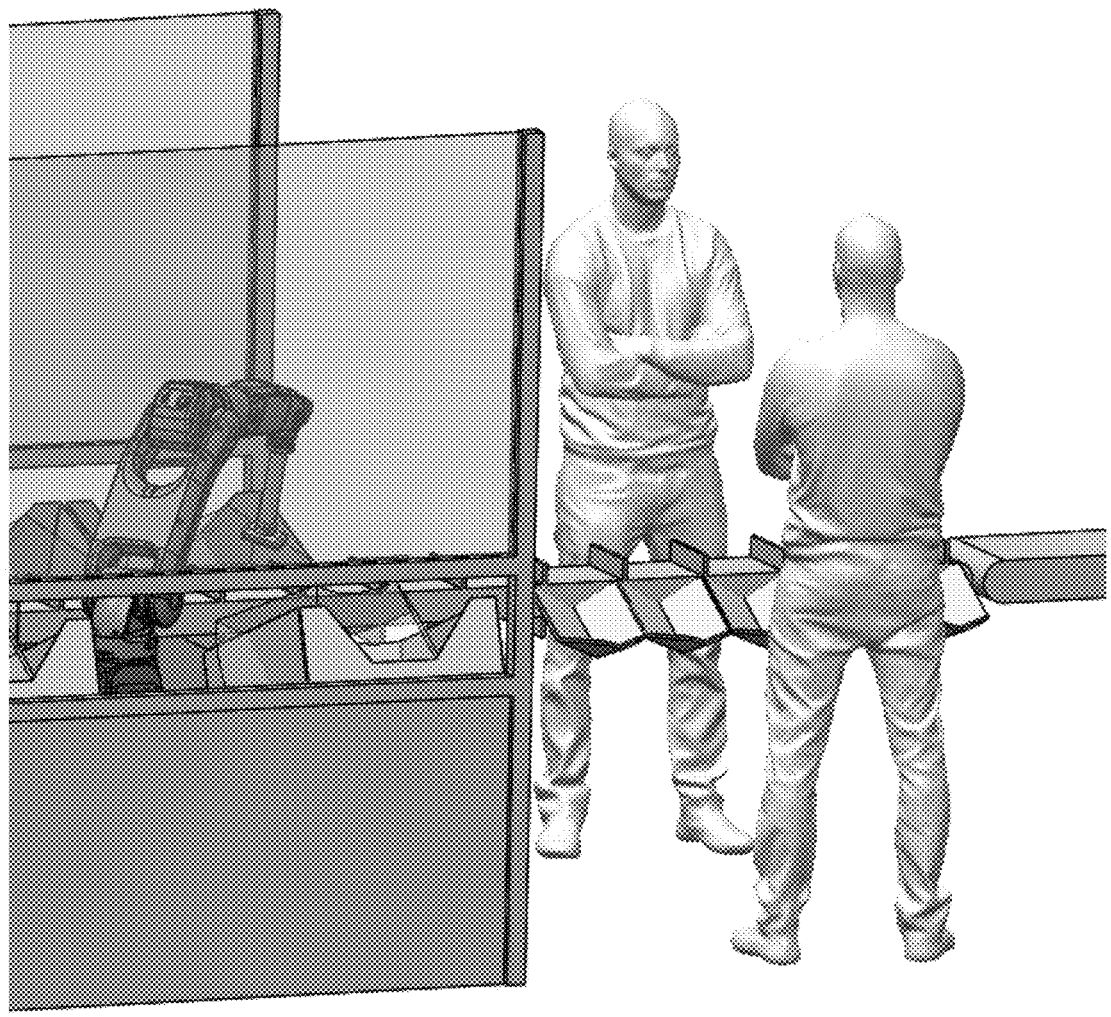
FIG. 13 is a detailed schematic representation of a variation of the system using a cleated conveyor system.

In some variations, item totes may be implemented more as a chute or defined cavity that can be integrated into the conveyor system 120. In one such variation, the conveyor system 120 may have a number of defined cavities in which a set of items are added. The set of items once collected within the defined cavity can then be conveyed and handled in any suitable manner further down the line such as being subject to manual bagging or packing and/or automated packing. In one exemplary implementation, the conveyor system 120 is a cleated conveyor belt wherein items can be collected into a defined cavity item tote of the cleat as shown in FIG. 13. The system may additionally include pack-out chutes that can be used as a funnel or channel for directing items into the defined cavity between the cleats. This variation may be particularly useful for packing items into a pouch or bag. Human operators at the end of the robotic kitting line can slide or move collected items into a bag, pouch, or other suitable form of packaging. Alternatively, a mechanical pusher or other mechanism can deposit items from the item tote into a bag, pouch, or other suitable form of packaging.

The conveyor system 120 is preferably communicatively coupled to the packing control system 130 and its operation can be monitored and/or controlled by the packing control system 130.

The conveyor system 120 can be a conveyor belt system, a roller conveyor, a track-based conveyor system, a chain conveyor, and/or any suitable type of conveying machine.

The conveyor system 120 may be fully connected along the robotic kitting line wherein movement of all totes is moved in synchronization. In some variations, subsections along the robotic kitting line may have independently controlled conveyor subsystems. For example, a tote may be moved by a robotic workcell 110 independent of other conveyor sections adjacent to other workcells 110.

In some variations, the conveyor system 120 may be supplemented or otherwise augmented with other systems such as a tote hold system a reverse conveyor system.

In one variation, the conveyor system 120 may include a tote hold system, which functions to divert a tote to a holding station as shown in FIG. 5. A robotic workcell 110 may each have a tote hold system with a plurality of holding stations. As with the item bins and the totes, the totes in the holding station are preferably within a reachable area of the robotic system 111. A tote diverter mechanism could be a directionally controlled conveyor system, a piston, or other mechanism to push or redirect an item tote 121 elsewhere or any suitable mechanism to move a tote between a position on a conveyor system and a holding station. In some cases, the tote hold system may be used to temporarily hold a tote. The tote hold system could also be used to reorganize or adjust the order of totes. Alternatively, the robotic system 111 may be configured to selectively manipulate an item tote 121 and divert the tote between the conveyor system 120 and a hold station.

In another variation, the conveyor system 120 may include a reverse conveyor system. Totes may be selectively redirected onto a reverse conveyor system so that they be returned upstream in the robotic kitting line. This may be used so that if an item was not properly placed the system can reattempt item placement by running the item tote 121 through the robotic kitting line a subsequent time.

The conveyor system 120 may alternatively include other suitable conveyor subsystems that can be dynamically controlled to direct item totes through the robotic workcells 110 according to the order associated with a particular item tote. In one exemplary variation the conveyor system 120 may include one or more conveyor switches to redirect one line of item totes to one of two or more different sections of the conveyor system. A conveyor switch may be used so that item totes can be loaded onto one section of the conveyor system 120 and then selectively redirected to different sequences of workcells 110 that are in parallel portions of a conveyor lines in the conveyor system 120. In such a variation, the system may make use of multiple subsets of robotic workcells that are arranged in series and/or parallel on different subsections of the conveyor system 120. Accordingly, the system may be configured for any suitable network of conveyor system with different subsets of robotic workcells 110.

The packing control system 130 functions to operate the robotic workcells no and the conveyor system 120 according to supplied order requirements. The specified input may be based on a set of packing orders. The packing orders are characterized through a data representation of an order request, which may be supplied by an order system 140 and/or other suitable sources. A packing order may specify a collection of items to be grouped together in a package. An order may additionally specify priority or timing goals and/or requirements. Orders may be specified in bulk such as fifty orders including one item A and one item B. Orders may alternatively be specified individually such as specifying a single order for items A, B, and C.

The packing control system 130 can include configuration to: assign a sequence of packing orders assigned to item totes conveyed by the conveyor system 120, where each item tote is assigned a packing order from a set of order requests, and/or direct distribution and loading of the set of item bins at locations across the set of robotic workcells 110 for progressive packing of the item totes 121.

The packing control system 130 as discussed can be communicatively coupled to the robotic system in of each robotic workcell 110 and the conveyor system 120. In one variation, the packing control system 130 can be fully control in control of both the robotic workcell no and the conveyor system 120. In another variation, the packing control system 130 can be in control of the robotic workcell no and an observer of a conveyor system that is controlled external to the system. For example, the system may operate around a conveyor line that is continuously operated, preconfigured to move in a certain way, or controlled by another control system. The packing control system 130 may alternatively be interested with the robotic workcells 110 and/or the conveyor system 120 in any suitable configuration.

The packing control system can additionally be in communication with a sensing system which may be monitoring item bins, tote position, item placement in totes, item position in item bins, and/or any suitable aspect. The system may include a sensing system which can include one or more types of sensors such as camera/imaging devices, proximity sensors, contact sensors, and/or other suitable types of sensors.

The packing control system 130 preferably processes orders or packing requests and determines an execution plan. In particular, the control system 130 preferably includes configuration to: process order requests; direct loading of item bins at specific locations across the set of robotic workcells according to the packing fulfillment plan; and manage operation of the set of robotic workcells to fulfill packing of the order requests. The control system 130 preferably includes machine readable memory (e.g., non-transitory machine-readable storage) configured with instructions configured to cause one or more processors to perform set operations of the configuration, which may include any suitable combination of the processes described herein.

In one implementation, the packing control system 130 can take as input a list of requested order (e.g., "kits") from a warehouse management system or another suitable type of order system 140. The packing control system 130 can be configured to automatically fulfill the orders it can from the items within the item bins 112 in the system. As item bins 112 become depleted, the packing control system will signal directives for replenishment.

Configuration to process order requests functions to transform digital orders into an optimized configuration for processing. The result of processing order requests can be a packing fulfillment plan (i.e., an "execution plan"), which includes a set of machine interpretable settings, instructions and/or other forms of system configuration defining how the system should be setup and/or operated. The packing fulfillment plan can determine how item bins are distributed across the robotic workcells 110, the sequence of how orders are assigned to item totes 121, assignment of which item(s) in which item bins 112 are placed by which robotic pick-and-place machines 111.

The packing fulfillment plan is preferably a data-driven result based on the orders, historical packing fulfillment records, machine learning model and/or training data status (e.g., which items have higher confidence for placement), and/or other inputs. More specifically, the packing fulfillment plan may additionally or alternatively be based on other inputs such as item bin placement, item count in the item bin, predicted or historical item placement time or success rates, target item arrangement in destination tote, predicted or historical future orders or requests, packing targets (e.g., deadlines for outgoing orders), time to replenish item bins, predicted or historical success of item pick-and-placement attempts for a given item type, and/or other alternative inputs.

Optimized configuration here does not characterize a single optimal solution but plans that achieve enhanced performance for one or more objectives and/or constraints. The packing fulfillment plan can be designed to increase throughput or optimized towards other parameters.

A packing fulfillment plan may be generated with an objective to increase or otherwise enhance the order output of the system—packing as many orders as possible in a given amount of time.

Another potential packing fulfillment plan may be to balance potential demand for additional work in post processing to finalize packing of orders. For example, in some implementations, workers may be used to resolve issues or perform supplementary packing tasks after processing by the system. This labor may not be required for every order and so the system could balance workload to avoid having human-assisted tasks act as a bottle neck for processing the set of orders.

An alternative potential packing fulfillment plan may be to compress the time window for packing orders with higher probabilities for needing additional labor to resolve issues. For example, the packing fulfillment plan, may arrange processing of orders so that potential work for human-assistance in finalizing packing (e.g., resolving issues, performing additional packing tasks, etc.) is localized within some window.

As another potential objective, the packing fulfillment plan may balance work tasks for updating configuration of the system (e.g., exchanging or updating item bins). The balancing of work tasks may evenly distribute tasks over time and/or across robotic workcells 110. The balancing may alternatively condense or localize certain work tasks to a particular time window and/or a robotic workcell. Different implementations and situations may call for different approaches. For example, in one implementation, the work tasks can be distributed over time to avoid situations where many item bins need updating at the same time. However, in other situations, the work tasks may be planned for being needing completion within a select time window so that it can be completed all at once.

Another potential packing fulfillment objective could be to reduce dependence on post-processing correction. This objective may optimize for higher probabilities of the system successfully automatically resolving packing mistakes. For example, this objective could result in more redundant item bins being placed downstream so that placement errors can be automatically corrected if an upstream robotic workcell 100 fails to properly place an item.

Multiple objectives may be factored into setting of a packing fulfillment plan. The objectives could be prioritized so that different possible plans could be scored and compared, with a final packing fulfillment plan select based on ranking of how possible plans satisfy a plurality of objectives.

The digital orders will generally convey what items are to be collected together for an order. The digital orders may additionally specify timing or priority properties for a particular order. The digital orders may additionally have item arrangement details, and/or other constraints or details related to packing of items for an order.

Configuration of the packing control system for processing the set of order requests and setting the packing fulfillment plan process for the robotic kitting line may include a variety of computer-implemented processes that determine properties of the packing fulfillment plan. The set of computer-implemented processes used and the objectives of those processes may use application dependent optimization processes.

In one example, a kitting usage scenario may have the configuration of the packing control system 130 evaluate conditions of the robotic kitting line and the order requests to minimize swaps of item bins and to enhance throughput in processing the kits. The packing control system 130 may implement one or more analysis processes to output order-to-tote assignments and/or item bin positioning to enhance balance of work performed by the robotic workcells (e.g., reducing instances when one robotic workcell is holding up work by other robotic workcells) and to reduce changes to item bin positioning (e.g., reducing time and labor involved in updating item bins).

In one particular implementation, the packing control system 130 includes a graph model representation of order fulfillment and which can be used in determining a minimal cost path through the graph model, which can be associated with achieving a reduced number of item bin updates. The sequence of packing orders assigned to the item totes can be based on the minimal cost path through the graph model. In such an exemplary graph data model, each order request is represented by a node in the graph, where the node is described by the set of items for the associated order. The distance between each node can be modeled as the set difference of the items in the connected nodes. The modeled graph can be assessed using traveling salesman problem process (or other suitable process) to find a shortened path through the graph. An open problem graph process can be used to determine a sequencing of orders that can minimize or reduce the set difference of kits over time thereby minimizing swaps. Other factors could additionally be incorporated such as individual cost of item bin swaps, time to place each item, and the like. Various techniques such as use of dynamic programming or other techniques may be employed.

The packing control system 130 may include an additional or alternative processing layer of processing that functions to output an appropriate distribution (slotting) of item bins across the set of robotic workcells. The results are used in directing distribution of item bins across the set of robotic workcells. This can load balance work of the robotic workcell. In an ideal situation, the item bins are distributed such that work of the robotic workcells is evenly distributed. In some situations, however, load balancing achieves improved balancing of work. Distribution of item bins can account for current item bin positioning, predicted time for processing different types of items, and/or other considerations.

In one example, a "forward pick" usage scenario may use the robot kitting line to improve packing of popular items and so product SKUs may be distributed (i.e., "slotted") in positions based on favorability of different positions and the popularity of the product SKU.

Configuration to direct loading of item bins at specific locations across the set of robotic workcells according to the packing fulfillment plan functions to determine and instrument the system in how item bins are stocked with different items across the robotic workcells 110. In general, each robotic workcell no will be set up with a limited subset of types of items that it can load for an order (i.e., a set of workcell item types). In some implementations, the set of workcell item types will not be the same for each robotic workcell in the set of robotic workcells. In other words, the robotic workcells 110 can be configured with heterogeneous sets of workcell item types. However, the system is not limited to such implementations. The distribution and placement of item bins can be used to impact various factors in processing orders such as the available stock of items that can currently be placed by the system, the type of orders that can be fulfilled, redundancy, and/or how many types of orders each workcell can assist with.

Configuration to direct loading of the set of item bins may include configuration to update a user interface of one or more computing devices, used in connection with one or more robotic workcells 110, with loading instructions. The configuration to direct loading may additionally include configuration to receiving confirmation of item bin loading. In this variation, the system can include workcell computing device used for coordinating user-assisted updates to the item bins 112. This can include generating user interface output (outputting signals such as updating a display or triggering audio signals) to inform a worker as to what action is to be taken and how regarding updates to the item bins 112. This can additionally include user interface inputs to receive item bin updates regarding changes made to item bins 112 (such as receiving confirmation of item bin changes, receiving updates on lack of item stock, etc.). Tracking of such item bin updates is used in controlling operation of the conveyor system 120 and the robotic workcells 110, and the updates to the user interface outputs are timed according to real-time requirements/objectives of the system. For example, each robotic workcell may include one computer-controlled display that can be updated with item bin loading instructions such as what items are to be loaded into the set of item bins of a particular robotic workcell 110, when to remove an item bin, when to change an item bin, and/or other suitable instructions.

In some variations, the workcell computing devices can include one or more user input element (e.g., a button, a touch screen, switch, etc.) that upon activation updates the packing control system 130. The user input element(s) can be used to signal when a loading instruction is completed. The user input element may also be used to signal when a loading instruction cannot be completed. For example, if inventory of an item is not available for loading into an item bin, then this can be communicated which may result in the packing control system 130, updating its packing fulfillment plan.

Configuration to direct loading of the set of item bins may include configuration to direct an automated item delivery robot to transport an item bin to a specified location of a workcell within the set of workcells 110. This can include communicating to an item delivery robot. This may alternatively include actively controlling an item delivery robot. In this variation, an automated or semi-automated system is controlled to deliver or update item bins. In one implementation, a warehouse may have item bins preliminary stocked and stored in a holding area (outside of the system) and the item delivery robots will dynamically fetch an item bin and load it into a designated item bin location.

In addition to or as an alternative to an item delivery robot, other types of item delivery systems may alternatively be directed to control how items bins are stocked and/or updated. For example, item bin conveyor systems or item dispensing systems may additionally or alternatively be controlled.

Item bins are preferably distributed across the robotic workcells such that collectively the set of robotic workcells can fulfill the orders assigned to the current item totes passing through the system. The item bins will generally be updated and changed, as required, to accommodate different orders. The item bins (and the types of items in them) is preferably coordinated by the packing control system 130 for enhanced processing of the orders. As one configuration option, the item bins 112 can include a distributed arrangement of item bins (as directed by the packing control system 130, where redundant item bins are located in at least two robotic workcells 110. This may be used for: items that are more commonly to potentially be packed by multiple robotic workcells, providing error correction if an upstream item placement attempt fails, planning of continued packing of an item while one of the item bins is being changed, and/or for other situations.

Configuration to manage operation of the set of robotic workcells to fulfill packing of the order requests, functions to operate the robotic pick-and-place machines in and the conveyor system 120 in a coordinated manner for packing item totes.

Configuration to manage operation of the set of robotic workcells can include configuration to control the conveyor system for transport of item totes through the robotic workcells 110, and, for each item tote, progressively pack items of an order request assigned to an item tote by incrementally packing items at robotic workcells of the set of robotic workcells.

The conveyor system in one variation incrementally moves the item totes through a series of robotic workcells 110, wherein each incremental move of the item tote is performed after item placement attempts by all robotic workcells 110. In other words, for each item tote within a robotic workcell, the robotic pick-and-place machine 111 will place (or at least attempt to place) the items assigned for placement within that workcell. In one variation, a single item tote will be located within a robotic workcell no at any one time, but other variations may have multiple item totes located within a robotic workcell 110 at one time. The conveyor system in another variation may continuously move item totes through the series of robotic workcells 110. In such a variation, the speed of movement of the item totes can be dynamically changed so that item placement attempts can be completed for each robotic workcell before the item tote moves out of a reachable range.

As described herein, the robotic kitting line may additionally monitor state of item placement attempts and dynamically adjust operation to resolve issues. As a resolution variation, this can include dynamically reassigning order assignments of item totes. For example, a first item tote may be originally assigned an order with items A and B and a second item tote may be originally assigned for an order with just item B. If placement of item A fails for the first item tote, the first order assignment may be swapped such that the first item tote is reassigned the order with items B and the second item tote (which has not passed through the robotic workcell for placement of item A) is reassigned the order with just item B.

As another resolution variation, an item placement attempt can be monitored and if the attempt fails, then a downstream robotic workcell with a duplicate item bin (of the item that was failed to be placed) can be updated to attempt item placement.

Monitoring of placement attempts is not only used in corrected or addressing current item totes, but also used in updating one or more data models used by the packing control system 130 for placement. For example, placement attempt failures or errors may be detected, tracked, and used to subsequently adjust planning for how item bins are distributed and amount of time allocated for placing such an item.

The sensing system functions to collect data of the objects and the environment. The sensing system preferably includes an imaging system, which functions to collect image data. The imaging system preferably includes at least one imaging device with a field of view of a region of interest within the robotic kitting line such as the item bins and/or the totes on the conveyor system 120. The imaging system may additionally include multiple imaging devices used to collect image data from multiple perspectives of a distinct region, overlapping regions, and/or distinct non-overlapping regions. The set of imaging devices (e.g., one imaging device or a plurality of imaging devices) may include a visual imaging device (e.g., a camera). The set of imaging devices may additionally or alternatively include other types of imaging devices such as a depth camera. Other suitable types of imaging devices may additionally or alternatively be used.

Other sensors such as load cells, proximity sensors, RFID tracking systems, and the like may also be used to monitor status of various aspects of the system such as the position of a tote.

The system can include or be integrated with an order system 140. The order system 140 functions to receive pending orders and communicate orders to the packing control system 130. The order system 140 can be the source of packing orders, which specify the items to be included in a given package. The order system 140 may also specify quantity, timing requirements, item placement arrangement, and/or other aspects. The system is preferably operated so as to fulfill the packing orders. The packing control system 130 preferably develops a packing fulfillment plan to satisfy the orders from the order system 140. This may include fulfilling individual order targets. For example, an order may be tagged with a fulfillment deadline that is used to determine the maximum time that the order can be held. The order system 140 allows the fulfillment of custom kits (each kit unique) by tracking and labeling each order as it is outputted from the system.

In one variation, the order system 140 may be integrated with an e-commerce platform wherein digital orders are converted to orders to be processed by the system. In another variation, the order system 140 may be an administrative interface wherein orders can be manually or programmatically added.

Configuration of the control system to process order requests to set the packing fulfillment plan includes configuration to update the packing fulfillment plan in response to pending orders received by the order system. The order system 140 may enable periodic or continuous updates to a set of pending orders, which can result in periodic or continuous updates to the packing fulfillment plan. Updates to the packing fulfillment plan can result in updates item bin distribution and system operation. For example, order assignments to item totes can be changed, distribution of item bins across the robotic workcells 110 may be reconfigured, and/or placement instructions for robotic pick-and-place machines 111 can be changed.

3. Method

Figure 6:
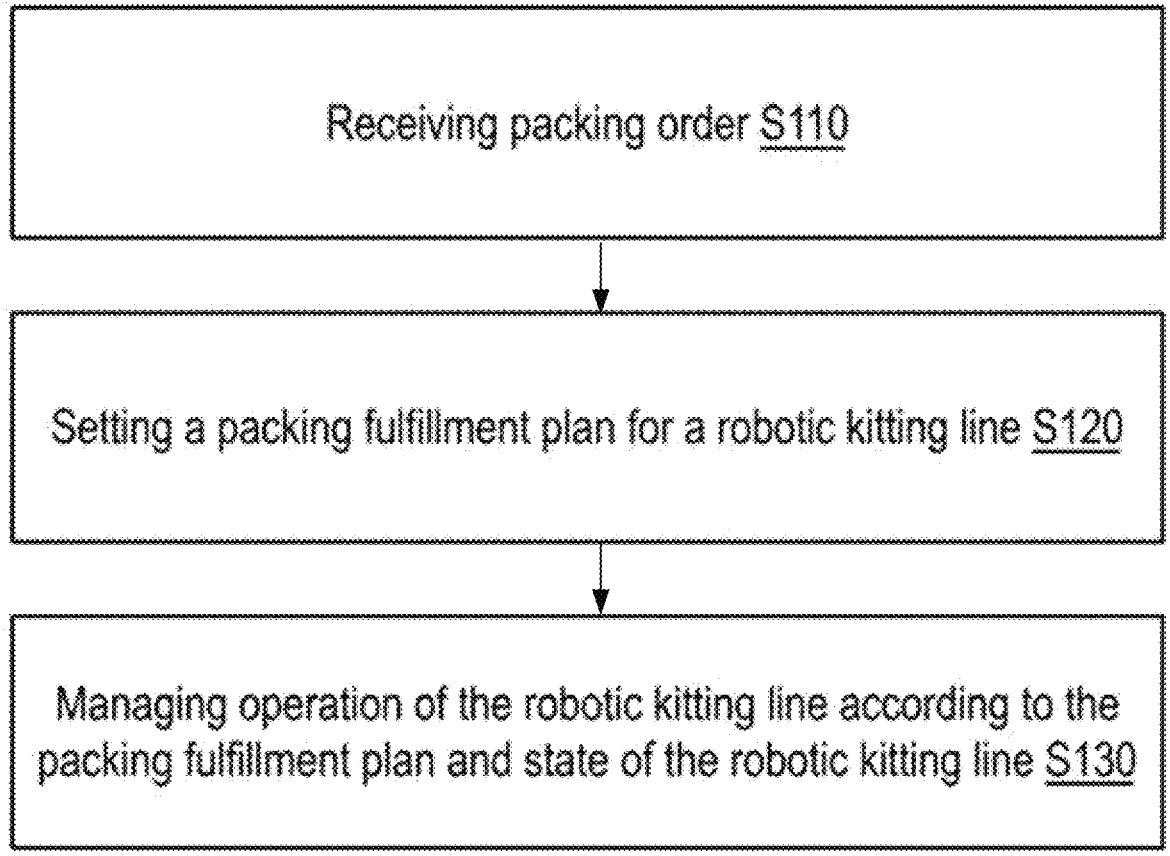
FIG. 6 is a flowchart representation of a first method.

As shown in FIG. 6, a method for a dynamic robotic kitting line can include setting a packing fulfillment plan for a robotic kitting line S20 and managing operation of the robotic kitting line according to the packing fulfillment plan and state of the robotic kitting line S30. The method functions to dynamically allocate and configure operation of a robotic kitting line system (such as described above) for coordinated packing of orders. In one preferred implementation, the method may have particular benefits in fulfilling kitting orders were different combinations of a limited set of items are frequently combined in packing orders.

The method may additionally include receiving packing order S10 such that the method includes: receiving packing orders S10, setting a packing fulfillment plan for a robotic kitting line S20, and managing operation of the robotic kitting line according to the packing fulfillment plan and state of the robotic kitting line S30.

Variations of the method may function to provide control functionality which can generally include the processing of orders to determine and thereby configure and instruct a robotic kitting line, such as described above, for execution of coordinated packing of orders. Other variations of the method may function to implement packing execution, which can generally include the packing of orders through operation of a system such as described above. In general, an implementation may incorporate the control functionality with packing execution.

In some variations, the method is implemented for the dynamic configuration and setup of a robotic kitting system to enable packing fulfillment by the robotic kitting system. In such a variation, the method may include receiving packing orders S10 and setting a packing fulfillment plan for a robotic kitting line S20.

In some variations, the method is implemented for operating a configured robotic kitting system in fulfillment of a set of orders. In such a variation, the method may include one or more processed for managing operation of the robotic kitting line according to the packing fulfillment plan and state of the robotic kitting line S30.

The method can be implemented by a system such as the one described above or any suitable system. Similarly, the system, or a suitably similar system may be configured to implement one or more of the variations of processes described herein.

The method is preferably implemented in combination with a robotic kitting system such as the one described above but may alternatively be used in combination with any suitable robotic kitting system that includes a plurality of robotic picker systems arranged along the length of a conveyor system, and where each robotic picker system has a plurality of item bins within grasping range. Preferably, there is a redundancy of at least a subset of item bins for one type of item. The method can adapt to different and new packing order objectives. The method may additionally or alternatively adapt operation of the robotic kitting line to the real-time conditions such as: updates to training of machine learning models used in grasp planning of a robotic system, success rates of packing a type of item, configuration of a robot (e.g., type of end effector), and/or other conditions.

In one variation of the method, the method is used with a robotic kitting line that includes a conveyor system, a set of robotic workcells arranged along the conveyor system, and where each robotic workcell includes at least one robotic pick-and-place machine and a set of item bins. In such a variation, as shown in FIG. 7, the method includes: processing a set of order requests and setting a packing fulfillment plan process for a robotic kitting line S120, wherein setting the packing fulfillment plan comprises: assigning sequencing of item totes conveyed by the conveyor system, where each item tote is assigned an order in the set of order requests S122, and directing distribution of item bins across the set of robotic workcells of the robotic kitting line for progressive packing of item totes S124; and managing operation of the robotic kitting line according to the packing fulfillment plan and a state of robotic kitting line S130, which includes: conveying item totes through the set of robotic workcells S132 and progressively packing items of an order assigned to an item tote through incrementally packing items at robotic workcells of the set of robotic workcells S134.

Figure 8:
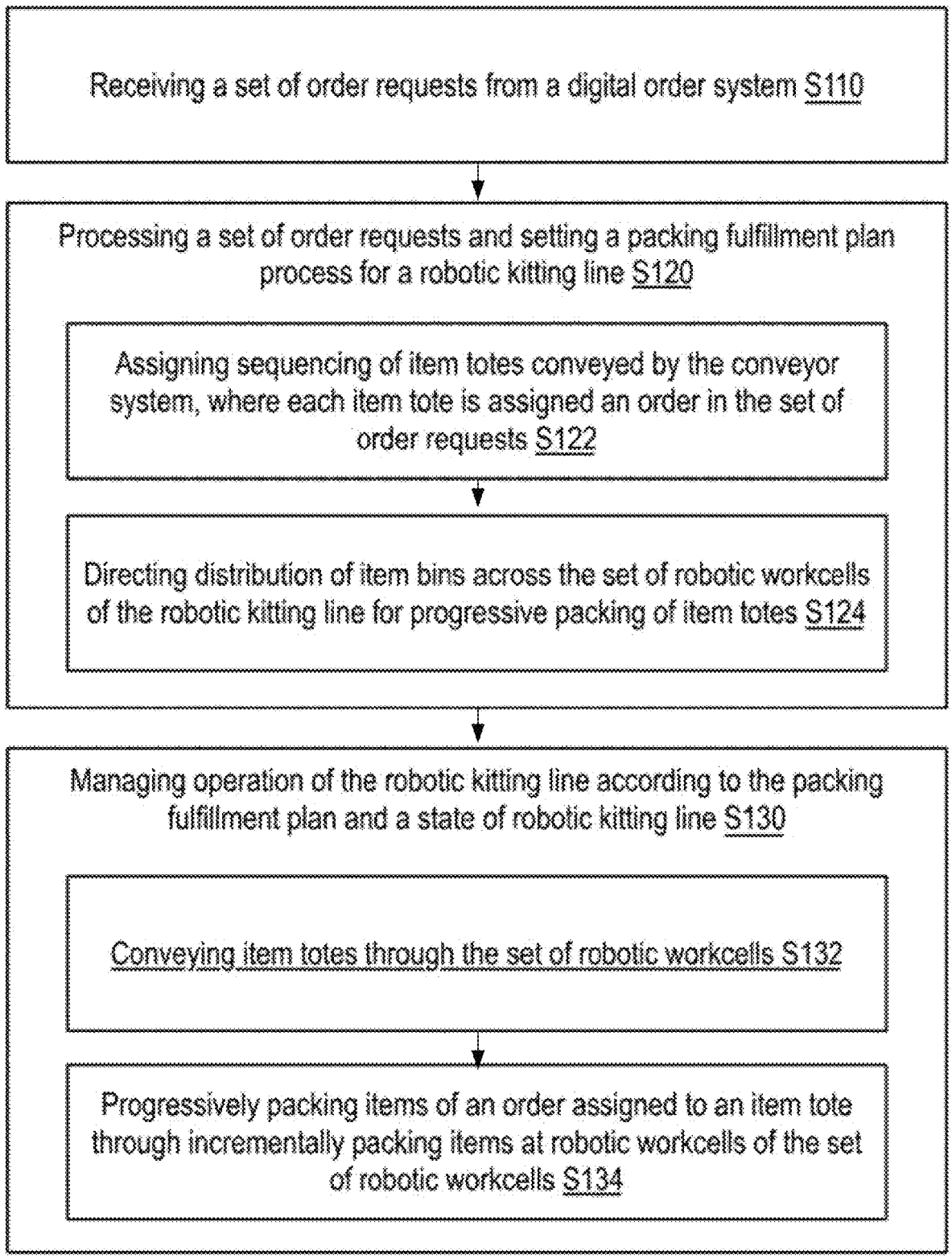
FIG. 8 is a flowchart representation of a variation of the method.

In another variation, as shown in FIG. 8, the method includes, receiving a set of order requests from a digital order system S110; processing a set of order requests and setting a packing fulfillment plan process for a robotic kitting line S120, wherein setting the packing fulfillment plan comprises: assigning sequencing of item totes conveyed by the conveyor system, where each item tote is assigned an order in the set of order requests S122, and directing distribution of item bins across the set of robotic workcells of the robotic kitting line for progressive packing of item totes S124; and managing operation of the robotic kitting line according to the packing fulfillment plan and a state of robotic kitting line S130, which includes: conveying item totes through the set of robotic workcells S132 and progressively packing items of an order assigned to an item tote through incrementally packing items at robotic workcells of the set of robotic workcells S134.

For example in one implementation, a computer-readable medium (e.g., non-transitory computer-readable medium) storing instructions that, when executed by one or more computer processors of a robotic packing system, cause the robotic packing system to perform one or more of the operations: receiving a set of order requests from a digital order system; processing a set of order requests and setting a packing fulfillment plan process for a robotic kitting line, wherein setting the packing fulfillment plan comprises: assigning sequencing of item totes conveyed by the conveyor system, where each item tote is assigned an order in the set of order requests, and directing distribution of item bins across the set of robotic workcells of the robotic kitting line for progressive packing of item totes; and managing operation of the robotic kitting line according to the packing fulfillment plan and a state of robotic kitting line, which includes: conveying item totes through the set of robotic workcells and progressively packing items of an order assigned to an item tote through incrementally packing items at robotic workcells of the set of robotic workcells.

Block S110, which includes receiving a set of order requests from a digital order system, functions to obtain one or more requests for packing items. The method can be used in a variety of different packing solutions. The packing orders and the manner in which they are received may vary depending on the application and situation.

The packing orders may be retrieved or otherwise communicated from an order management system. In another variation, an operator may use a user administrator interface to specify or set the system with some configuration for fulfillment of packing orders.

In one variation, receiving packing orders includes receiving a request for a number of kit orders. A kit order may be a grouping of items that may be replicated any suitable number of items. For example, receiving packing orders may include receiving a request to fulfill one hundred orders of one kit that includes products A, B, and C and fifty orders of a kit that includes products A, B, D, and E. In some variations, kit orders may be issued in bulk but may alternatively be received individually or in small batches.

In another variation, receiving packing orders includes receiving a set of independent packing orders. The set of independent packing orders can be a list of different individual orders that specify a set of items (e.g., one or more items) that are to be packed into one container (e.g., box or bag). When an ordering system is integrated with a digital e-commerce platform, then individual orders may be generated in response to a new customer order on the digital e-commerce platform.

A packing order can specify a set of items to be collected into one item. The packing order will generally include data properties that define the item type and quantity. The packing order may additionally indicate order processing preferences/properties. One type of order processing property can be a completion deadline. For example, an order may need to be processed by the end of the day, within some time window, or have no defined deadline. Another type of order processing property can be an order priority level, which can be used to determine relative priority of one order compared to another order.

In some variations, receiving packing orders may additionally include receiving arrangement configuration. Alternatively, the method may include generating an arrangement configuration for a set of items from a packing order. An arrangement configuration may specify specific arrangement of items and/or arrangement rules when determining how to position items within a tote.

Block S120, which includes processing a set of order requests and setting a packing fulfillment plan process for a robotic kitting line, functions to determine an execution plan in order to complete the packing orders.

Setting the packing fulfillment plan organizes the order of processing and generates instructions and operations for the components of the robotic kitting line and the conveyor system. This process may optimize for increasing throughput (e.g., the number of packages output within a given time period). Additionally or alternatively, a packing fulfillment plan may be optimized or planned with other objectives or targets. For example, the packing fulfillment plan may be generated so as to reduce the work involved in replenishing or changing the item bins. In another example, the packing fulfillment plan may be generated so as to get a collection of orders processed within their own specific deadlines.

Setting the packing fulfillment plan can include processes such as: assigning sequencing of item totes conveyed by the conveyor system, where each item tote is assigned an order in the set of order requests S122 and directing distribution of item bins across the set of robotic workcells of the robotic kitting line for progressive packing of item totes 124. In some variations, block S120 may additionally or alternatively include assigning item arrangement layout for a set of items of a particular order and/or setting other plans in fulfillment packing orders.

As discussed herein, in some variations, the method is implemented wherein processing the set of order requests and setting the packing fulfillment plan process for the robotic kitting line 120 intelligently optimizes in response to updates to the set of order requests (e.g., receiving new order requests), results of item placement attempts, item inventory status of item bins, and/or other factors.

A packing control system preferably manages periodic or continuous directives to the robotic kitting line so that the robotic kitting line can dynamically fulfill the received order requests.

Block S122, which includes assigning sequencing of item totes conveyed by the conveyor system, where each item tote is assigned an order in the set of order requests, functions to determine how orders are ordered and executed across multiple item totes being processed by the robotic kitting line. Setting the sequence of order fulfillment determines the order of order fulfillment and their association with totes on the conveyor system.

Setting the sequence of order fulfillment can additionally include, for each tote, setting the order of item placement based on workcell location and distribution of item bins across the set of workcells. For example, setting the order of item placement for a tote assigned an order for items A, B, and C may be planned for placement of item B in workstation 1, placement of A in workstation 2, and placement of item C in workstation 4. The sequence of order fulfillment may be based on numerous factors such as predicted item pick-and-place time duration, predicted likelihood of success of item placement, planning for end effector tool changes, planning for item bin replenishment or changes, and other considerations may additionally be incorporated into the process of setting a packing fulfillment plan. The order of item placement is additionally coordinated across the item totes being processed in parallel within the robotic kitting line. For example, the sequence of order fulfillment (which order is assigned to which tote) and/or item placement order (which item is placed in which workstation for each tote) can be organized for enhanced or optimized utilization of the robotic workcells.

Block S124, which includes directing distribution of item bins across the set of robotic workcells of the robotic kitting line for progressive packing of item totes, functions to configure the item bin layout for the set of robotic workcells.

When the item bin distribution configuration is automatically generated, the item bin layout may be generated or modified from a current state. The state could include the pending orders, the state of current item bins (e.g., current item bin placement and current inventory stock). Generating or updating the item bin layout functions to set a map for how item bins should be configured. This item bin positioning across different robotic workcells can account for the various combinations of items in the different orders as well as how to redundantly locate items across the robotic kitting line. Redundantly locating items includes having a particular item type positioned in multiple different item bins at different robotic workcells, which can provide optionality of when to place a given item within a tote. The method may use predictive modeling and/or historical statistical modeling to determining item bin positioning for different item types and collections of items.

Directing distribution of the item bins can include updating a user interface of one or more workcell computing devices, used in connection with one or more robotic workcells 110, with item bin loading instructions. Additionally, some variations may include receiving confirmation of item bin loading from the one or more workcell computing devices and correspondingly updating modeled state of the item bins. This updated modeled state of the item bins can be used when processing the set of order requests and setting the packing fulfillment plan. The workcell computing devices can be used for coordinating user-assisted updates to the item bins. This can include updating the user interface of the one or more workcell computing devices with directives to inform a worker as to what action is to be taken regarding the item bin distribution configuration. Received user input can be used in confirming changes made or not made to the item bins (such as receiving confirmation of item bin changes, receiving updates on lack of item stock, etc.).

Directing distribution of the item bins can additionally or alternatively include directing an automated item delivery robot to transport an item bin to a specified location of a workcell within the set of workcells. This can include communicating to an item delivery robot. This may alternatively include actively controlling an item delivery robot. In this variation, an automated or semi-automated system is controlled to deliver or update item bins. In one implementation, a warehouse may have item bins preliminary stocked and stored in a holding area (outside of the system) and the item delivery robots will dynamically fetch an item bin and load it into a designated item bin location.

Determining item bin locations may depend on various factors such as: the number of orders, gripping success/failure rates, the inventory levels of the item bins, the other items to be packed into the item tote and factors related to their placement, and/or the other packing orders for other item totes. These various factors may be weighed and analyzed to determine an appropriate plan for fulfilling all the packing orders in an efficient manner. As one limited example, items with higher gripping success rate may be biased towards placement at the end of the line compared to items with lower success rates which may be placed earlier in the line and, optionally, with redundant item bins downstream for retrying placement of the items in appropriate situations.

In some variations, processing the set of order requests and setting the packing fulfillment plan process can include setting item bin placement according to item grasp/placement predictive data. The packing fulfillment plan may be adjusted in several ways that weighs the grasp/placement predictive data. In one variation, directing distribution of item bins across the set of robotic workcells can include directing placement and/or placing a redundant item bin at a downstream robotic workcell for at least one type of item with item grasp/placement predictive data indicative of an item placement error rate (e.g., grasp error rate) satisfying some condition. The condition could be when a placement confidence level is below a set threshold or when the placement confidence level of one item relative to one or more of the types of items for placement satisfies some condition (e.g., most likely to encounter an error).

In one particular variation, setting item bin placement is based at least in part on grasp/placement confidence levels predicted through a machine learning model for an item of an item bin. In such variations, S124 can include setting the item bin placement according to the item grasp/placement predictive data can include calculating, using a machine learning model, a placement confidence score, and then assigning sequencing of item totes conveyed by the conveyor system and/or directing distribution of the item bins based in part on the placement confidence score. The placement confidence score characterizes a metric related to predicted likelihood of a robotic pick-and-place machine successfully picking up an item from an item bin and placing the item in a tote. The machine learning model may receive as input, image data of the item, item properties (e.g., size, weight, packaging description, item material, etc.), and/or historical data when outputting a confidence score. In this way, automated capabilities of the robotic kitting line can dynamically be incorporated into how the robotic kitting line is configured and used.

In some variations, the method may include receiving specification of an item bin layout configuration, which functions to have the item bin layout externally determined (e.g., worker specified). That layout may then be used in determining out totes are processed. For example, if bins of items are manually positioned along the line, then their position can be an input used for setting the sequence of order fulfillment.

In some variations, the method may include scheduling item bin replenishment, which functions to set conditions for when item bins are updated. Scheduling item bin replenishment may coordinate when to send notifications to workers so that item bins are replaced. This may factor in sensed worker position, tracked history of worker task completion, and/or other factors that could impact the timing for replenishing item bins to minimize impact to the operation of the robotic kitting line. In some instances, item bins can be replenished with zero impact to the operation of the robotic kitting line because the orders and operation of the robotic kitting line is such that orders not dependent on the currently changed item bins can continue while they are changed.

In variations where robotic item transport machines are used to move and relocate item bins, instructions and planning can be communicated to coordinate the operation of the robotic item transport machines.

Preferably, a packing fulfillment plan can be generated before operation of the robotic kitting line. However, the setting of a packing fulfillment plan may additionally include updating the packing fulfillment plan where a current state of the robotic kitting line is updated from its current state to adapt to new or modified plans. In one variation, updating the packing fulfillment plan can include dynamically updating the packing fulfillment plan in response to newly received order requests (such as received from a digital order system. In one example, the set of order requests are received from a digital order system, and the set of order requests changes as new order requests are generated and/or existing order requests change. This functions to adjust operation of the robotic kitting line according to current state of orders (e.g., changes in the orders).

In one variation, updating the packing fulfillment plan can include updating configuration of packing fulfillment plan in response to detected placement results. This variation can include monitoring placement attempt results and detecting success and/or errors (e.g., wrong number, incorrect alignment, etc.). For individual item totes, the packing operations performed by the robotic kitting line can be altered based on success or errors packing item for that item tote or other processed item totes. For subsequent processing of packing orders, the packing operations performed by the robotic kitting line can be adjusted accounting for chances of success as indicated (at least in part) by the monitored placement attempt results. The packing fulfillment plan may be updated to alter, for example, how the item totes are processed and/or how item bins are distributed. The state of managing operation of the robotic kitting line and/or newly received packing orders can be used in updating block S120, which functions to adapt the packing fulfillment plan to new conditions.

The method may additionally or alternatively include assigning item arrangement layout for a set of items of a particular order, which functions to determine how items are physically spaced and/or arranged when placed in an item tote. Assigning item arrangement layout may be set using a machine learning model to predict a suitable arrangement. The item arrangement layout may be determined to enhance packability (for space efficiency and/or mitigating risk of breaking). The item arrangement layout may be determined to enhance physical presentation.

Processing the set of order requests and setting the packing fulfillment plan process for the robotic kitting line S120 may use a variety of computer-implemented processes in determining the packing fulfillment plan process. Furthermore, the set of computer-implemented processes used and the objectives of those processes may use application dependent optimization processes.

In one example, a kitting usage scenario may evaluate conditions of the robotic kitting line and the order requests to minimize swaps of item bins and to enhance throughput in processing the kits. Process S120 may implement one or more analysis processes to determine order-to-tote assignments and item bin positioning to enhance balance of work performed by the robotic workcells (e.g., reducing instances when one robotic workcell is holding up work by other robotic workcells) and to reduce changes to item bin positioning (e.g., reducing time and labor involved in updating item bins).

In one particular implementation, assigning sequencing of item totes is performed by modeling fulfillment of order requests as a graph model and determining a path through graph that achieves a reduced number of item bin updates. This may be performed, for example, by modeling in data a graph where each order request represents a node in the graph, where the node is described by the set of items for the associated order. The distance between each node can be modeled as the set difference of the items in the connected nodes. The modeled graph can be assessed using traveling salesman problem process (or other suitable process) to find a shortened path through the graph. This open problem graph process finds a sequencing of orders that can minimize or reduce the set difference of kits over time thereby minimizing swaps. Other factors could additionally be incorporated such as individual cost of item bin swaps, time to place each item, and the like. Various techniques such as use of dynamic programming or other techniques may be employed.

A second layer of processing may then determine an appropriate distribution (slotting) of item bins across the set of robotic workcells. The results are used in directing distribution of item bins across the set of robotic workcells. This can load balance work of the robotic workcell. In an ideal situation, the item bins are distributed such that work of the robotic workcells is evenly distributed. In some situations, however, load balancing achieves improved balancing of work. Distribution of item bins can account for current item bin positioning, predicted time for processing different types of items, and/or other considerations.

In one example, a "forward pick" usage scenario may use the robot kitting line to improve packing of popular items and so product SKUs may be distributed (i.e., "slotted") in positions based on favorability of different positions and the popularity of the product SKU.

Block S130, which includes managing operation of the robotic kitting line according to the packing fulfillment plan and a state of robotic kitting line, functions to control operation of a set of robotic systems in synchronization with totes moved along a conveyor system.

Managing operation of the robotic kitting line can include communicating instructions based on the packing fulfillment plan to robotic systems and a conveyor system. The instructions may be communicated in real-time so that the components of the robotic kitting line are remotely controlled. The instructions may alternatively be communicated as a set of instructions outlining planned sequence of operations. Execution of the set of instructions may be interrupted or changed at any suitable time such as if the operation needs to be altered in response to new packing orders or a status change within the robotic kitting line.

Managing operation of the robotic kitting line can additionally include performing various operations at the active components of the robotic kitting line. Accordingly, managing operation of the robotic kitting line may include advancing an item tote and executing item placement attempts by the robotic pick-and-place machines of the various robotic workcells. More specifically, managing operation of the robotic kitting line can additionally include can include conveying item totes through the set of robotic workcells S132 and progressively packing items of an order assigned to an item tote through incrementally packing items at robotic workcells of the set of robotic workcells S134.

Block S132, which includes conveying item totes through the set of robotic workcells, functions to move an item tote between different robotic workcells. This will generally include advancing them from one upstream workcell to a subsequent downstream workcell. Though, in some variations, the conveyor system may enable alternative and/or selectable pathways between workcells. There is preferably a plurality of item totes that move downstream through a sequence of different robotic workcells. Depending on the assigned packing order for a particular item tote, items are added to the item tote as the item(s) are available within an adjacent robotic workcell and as the coordinated operation of the robotic kitting line determines.

Advancing the item tote preferably includes advancing the conveyor system, which depending on the type of conveyor system may be performed in a variety of ways.

In some variations, the conveyor system (and the transported/moved item totes) may be discretely advanced, wherein item totes are moved to a designated position. The item tote may be held stationary while items are placed in the item totes or other item totes within the robotic kitting line. In the variation where the conveyor system is a cleated conveyor system, the conveyor system moves incremental amounts so that items can be added to defined cavities (i.e., defined cavity item totes) of the conveyor system. In some alternative implementations, the conveyor system may be continuously operated, where items may be placed into an item tote without the item tote coming to rest. This variation may be used in implementations where a conveyor is not controlled as part of the method.

When advancing the item totes, the item totes are preferably advanced to be within the reach of a next robotic workcell. In this way, item totes can be moved through a sequence of robotic workcells. Multiple items may be moved within the reachable region of a robotic system so that multiple item totes can be the subject of item placement by one robotic workcell. For example, the robotic kitting line may be configured to allow 2, 3, or 4 item totes to be within a workcell.

Block S134, which includes progressively packing items of an order assigned to an item tote through incrementally packing items at robotic workcells of the set of robotic workcells, functions to execute item placement attempts where a robotic system of a workcell attempts to pick an item from an item bin, transport the item, and place the item into a designated item tote. In some cases, items may be placed with a designated arrangement within the item tote. In some cases, executing item placement may additionally include performing other operations such as scanning a product identifier.

Performing item placement by a robotic system for a diverse set of items in item bins may use various forms of modeling to improve the success rate of item placements. Item placement may involve modeling item grasp planning, modeling item manipulation by a set of available end effector tools, modeling item grasps for secondary objectives like barcode scanning, and/or other suitable processes used in automating item grasp execution.

Managing operation of the robotic kitting line may additionally include various processes related to the sensing the state of the robotic kitting line such as monitoring item bin status and monitoring item placement success (e.g., detecting grasping errors). Sensing the state of the robotic kitting line may be performed through various sensing approaches. In one preferred approach, sensing state includes collecting image data and processing the image data to determine status information. This may include performing computer vision on visual image data. This may alternatively include collecting a depth image (or other 3D or other forms of depth information) and performing some analysis on this multidimensional image information. For example, the quantity of items in an item bin may be estimated based on analysis of the depth map of the contents in the item bin.

Part of the process of managing operation of the robotic kitting line according to the packing fulfillment plan and a state of robotic kitting line can involve accommodating exceptions and various condition changes. Items may be dropped, item bins may run out of inventory, item bins may be unavailable during replenishment, items may be placed with poor arrangement within a tote, packing orders may be changed, and/or other aspects can change. Some variations of the method may address such challenges as part of managing operation of the robotic kitting line. The method can include various adaptive processes to detect these events and perform actions to remedy the issue.

As one variation of an adaptive process, the method enables live updates to packing order fulfillment. In some instances, the method may experience receiving updated packing orders as part of block S110, wherein packing orders are edited, canceled, and/or newly created. In response to such changes in the packing orders, the method may include reassessing the packing fulfillment plan based on the current status and then updating operation of the robotic kitting line accordingly. This variation may account for current packing orders and their associated item totes currently in process within the robotic kitting line. Available item inventory may be another source of changes to packing orders. Unexpected changes to item availability within the robotic kitting line may happen because of failed item packing (e.g., dropped items, or items not passing some validation testing), unscheduled changes to item inventory (e.g., an item bin manually pulled from the robotic kitting line), and/or other situations. The packing fulfillment plan can preferably be updated in response to changes in inventory.

As another variation of an adaptive process, the method may facilitate coordinated item restocking. Item restocking, in some variations, can be coordinated to reduce or even remove impact on the throughput of the robotic kitting line. For example, the method may schedule and direct item restocking for select item bins such that packing orders can continue while item bins are changed, resulting in no change in overall throughput (or at least reducing impact). This variation can include scheduling or otherwise planning item depletion of items from an item bin and directing item replenishment during a window of inactivity for the item bin. During the window of inactivity for the item bin, other orders are preferably fulfilled using other item bins. In some cases, orders that do not require the item(s) of the depleted item bin can be scheduled during the window of inactivity. In other cases, orders that do require the item are fulfilled using an alternative item bin containing the required item(s). The duration of the window may additionally be planned for a particular duration based on expected time to change the item bin. The duration may be based on historical data, location and/or status of workers and/or robotic transport devices (e.g., sensed location and/or task status within a task management system). Directing the item replenishment may include sending instructions to a robotic transport device to transport items to help in replenishing the item bin. Directing the item replenishment may additionally or alternatively include sending a notification to a human worker. In another variation, a user interface may be updated at an appropriate time to signal the current or upcoming task of refilling an item bin. This approach may additionally be used for changing item bins and/or repositioning item bins, which may be used to alter the mix of item bins across the robotic kitting line.

As another variation of an adaptive process, internal replenishment or changes to the item bins may be automatically performed as part of the operation of the robotic kitting line. This variation may allow item bins to be replenished without any direct interaction with an item bin by an outside system or worker. In one exemplary variation, the method may include restocking an item bin from items contained in a transported item tote. Items for replenishment may be transported within an item tote, and then a robotic system can move the items from the item tote into an appropriate item bin. For example, a tote with a number of items may be introduced into the robotic kitting line, and an appropriate robotic workcell may move the items into an item bin.

In another variation, the method may automatically redistribute and rebalance item inventory between redundant item bins by passing items downstream. As discussed above, some variations of the system many include a reverse conveyor system so that items can be diverted back up stream. In this system variation, items may additionally be redistributed back upstream using the reverse conveyor system. In some cases, the totes used to transport the items during this item replenishment are used just to facilitate internal distribution of the items. In other situations, an item tote may be used to convey one or more items for redistribution but later or simultaneously used in fulfilling an order of other items.

As another variation of an adaptive process, the method may resolve errors in packing an item. In some implementations, the method can include detecting an error when placing an item within an item tote, advancing the item tote to a subsequent robotic workcell, and reattempting item placement from a redundant item bin. This can be used when directing distribution of item bins across the set of robotic workcells for progressive packing of item totes includes directing placement of at least one item bin to be a redundant downstream item bin to another item bin. In other words, at least two item bins have the same item type and are placed at different workcells placed in series. Other changes to how the items are packed for the item tote may also be triggered. In this way, even if item placement fails, the operation of the whole robotic kitting line can continue, which can reduce or limit the impact to throughput. As an exemplary scenario, items A and B may be planned for placement into a box at workcells 1 and 2 respectively. If item A is dropped during placement in workcell 1, then item A may be reattempted at workcell 2 and item B attempted at workcell 3.

As another alternative approach to resolving an error, the system many include a reverse conveyor system. In this system variation, the method may include diverting an item tote onto a reverse conveyor system if an item placement error and reattempting item placement.

As another alternative approach to resolving an error, the system many include a tote hold system. In this system variation, the method may include diverting an item tote onto a holding station of the tote hold system upon detecting item placement error and reattempting item placement and then diverting the item tote from the holding station onto the conveyor system when the item is successfully placed. The reattempted item placement may happen during a window when the robotic workcell has no assigned task. In some cases, the holding station may only be at certain locations such as at a final workcell. In this variation, the method may include diverting an item tote onto the holding station, placing item onto a second item tote at an upstream workcell, and moving the item from the second item tote to the item tote when within range of the holding station.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums (e.g., a non-transitory computer-readable medium) storing instructions that, when executed by the one or more computer processors, cause a computing platform to perform operations comprising those of the system or method described herein such as: receiving packing order, setting a packing fulfillment plan for a robotic kitting line, and managing operation of the robotic kitting line according to the packing fulfillment plan and state of the robotic kitting line.

Figure 14:
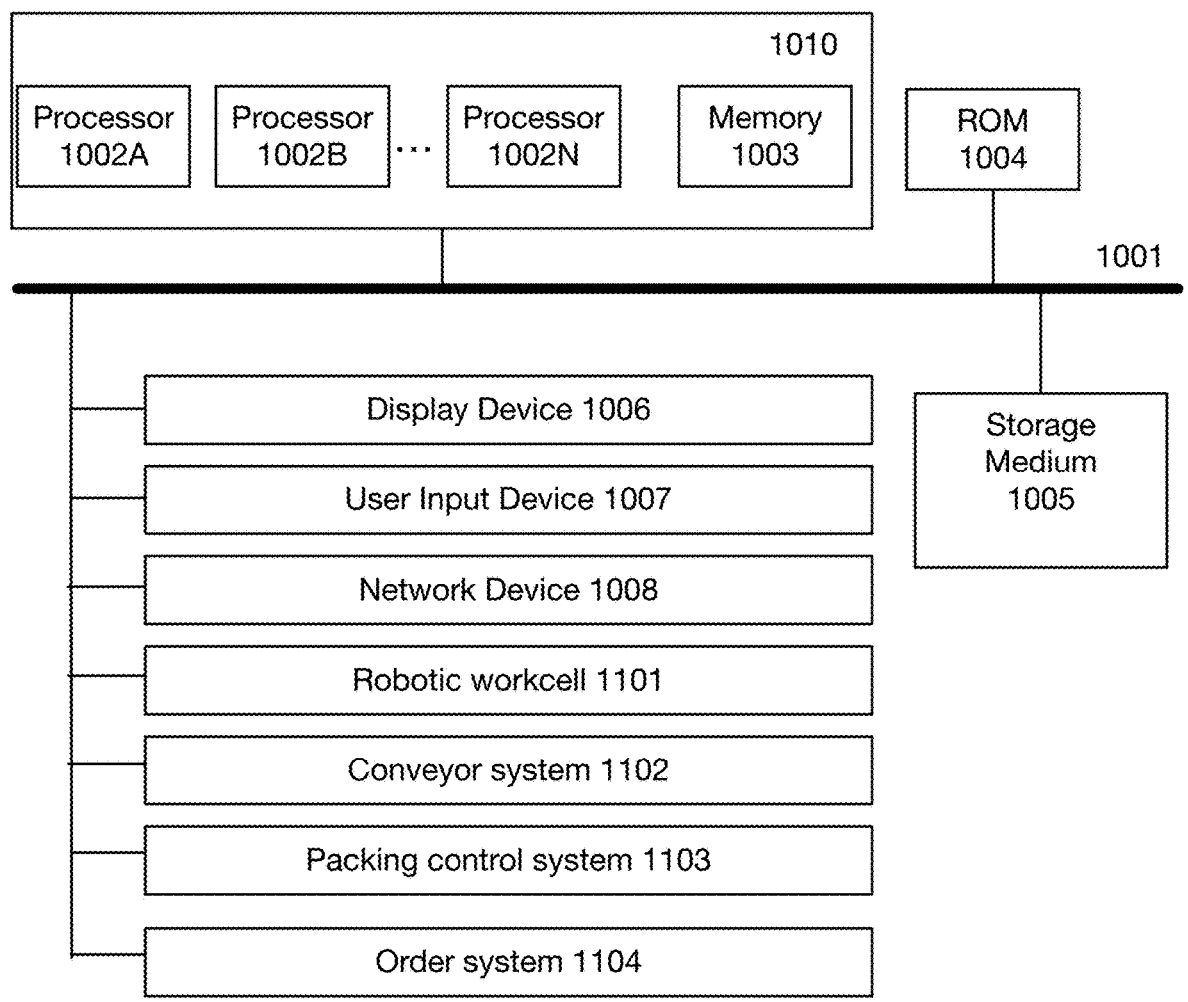
FIG. 14 is an exemplary system architecture that may be used in implementing the system and/or method.

FIG. 14 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random-access memory (RAM)) 1003, a read only memory (ROM) 1004, a processor-readable storage medium 1005, a display device 1006, a user input device 1007, and a network device 1008. As shown, the computer infrastructure may be used in connecting a robotic workcell 1101, a conveyor system 1102, a packing control system 1103, order system 1104, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A system for automated packing of items comprising:
   a conveyor system configured to transport a set of item totes through the conveyor system;
   a plurality of operatively coupled robotic workcells aligned in series along at least a portion of the conveyor system;
   wherein each robotic workcell of the plurality of robotic workcells comprises a robotic pick-and-place machine and a set of item bins, the set of item bins being within a reachable range of the robotic pick-and-place machine;
   a control system including configuration to: process order requests to automatically set a packing fulfillment plan in view of the plurality of operatively coupled robotic workcells, direct, according to the packing fulfillment plan, automatic supply loading of the set of item bins at locations across the plurality of robotic workcells, and manage operation of the plurality of robotic workcells to fulfill packing of the order requests.

2. The system of claim 1, wherein configuration to manage operation of the plurality of robotic workcells to fulfill packing of the order requests further comprises configuration to: to control the conveyor system for transport of item totes through the robotic workcells, and
   for each item tote, progressively pack items of an order request assigned to an item tote by incrementally packing items at robotic workcells of the plurality of robotic workcells.

3. The system of claim 1, wherein the control system further comprises configuration to assign sequence of packing orders assigned to item totes.

4. The system of claim 3, wherein the control system further comprises a packing control system comprising a graph model representation of order fulfillment, and configuration to determine a minimal cost path through the graph model, and wherein sequence of packing orders assigned to the item totes is based on the minimal cost path through the graph model.

5. The system of claim 1, wherein configuration to direct automatic supply loading of the set of item bins comprises configuration to update a user interface of one or more computing devices, used in connection with one or more robotic workcells of the plurality of robotic workcells, with loading instructions, and to receive confirmation of item bin loading.

6. The system of claim 1, wherein the configuration to direct automatic supply loading of the set of item bins comprises configuration to direct transport of an item bin to a specified location of a workcell within the plurality of robotic workcells.

7. The system of claim 1, wherein each robotic workcell has a set of item bins that comprises between two to eight item bins.

8. The system of claim 1, wherein the robotic pick-and-place machine is an articulated arm with an end effector.

9. The system of claim 1, further comprising an order system that receives pending orders and communicates orders to the control system, wherein configuration to process order requests to set the packing fulfillment plan comprises configuration to automatically update the packing fulfillment plan in response to pending orders received by the order system.

10. A method for automated packing of items comprising:
    processing a set of order requests and automatically setting a packing fulfillment plan process for a robotic kitting line, wherein robotic kitting line comprises a conveyor system, a plurality of operatively coupled robotic workcells arranged along the conveyor system, wherein each robotic workcell comprises at least one robotic pick-and-place machine and a set of item bins, and wherein the packing fulfillment plan is automatically set in view of the plurality of operatively coupled robotic workcells;
    wherein automatically setting the packing fulfillment plan comprises:
        assigning sequencing of item totes conveyed by the conveyor system, where each item tote is assigned an order request from the set of order requests, and
        directing distribution of item bins across the plurality of robotic workcells for progressive packing of item totes;
    automatic supply loading the set of item bins at locations across the plurality of robotic workcells; and
    managing operation of the robotic kitting line according to the packing fulfillment plan, which comprises:

conveying item totes through the plurality of robotic workcells, and for each item tote, progressively packing items of an order request assigned to an item tote by incrementally packing items at robotic workcells of the plurality of robotic workcells.

11. The method of claim 10, wherein automatically setting a packing fulfillment plan further comprises, for each item tote, setting an order of item placement based on workcell location and distribution of item bins across the plurality of robotic workcells.

12. The method of claim 10, wherein assigning sequencing of item totes conveyed by the conveyor system comprises setting an order of item placement based on workcell location and distribution of item bins.

13. The method of claim 10, wherein automatically setting a packing fulfillment plan comprises setting item bin placement according to a packing control system utilizing item grasp predictive data, wherein placement of a redundant item bin at a downstream robotic workcell is used for at least one type of item with item grasp predictive data indicative of an item placement error rate satisfying a condition.

14. The method of claim 10, wherein automatically setting a packing fulfillment plan comprises setting item bin placement based at least in part upon a packing control system utilizing grasp confidence levels predicted through a machine learning model for an item of an item bin.

15. The method of claim 10, further comprising utilizing a packing control system to detect an error when placing an item within an item tote, advance the item tote to a subsequent robotic workcell, and reattempt item placement from a redundant item bin at the subsequent robotic workcell.

16. The method of claim 10, wherein directing distribution of item bins across the plurality of robotic workcells comprises updating a user interface of one or more workcell computing devices with item bin loading instructions.

17. The method of claim 10, wherein directing distribution of item bins across the plurality of robotic workcells comprises directing transport of an item bin to a location of workcell within the plurality of robotic workcells.

18. The method of claim 10, further comprising: receiving the set of order requests from a digital order system; and automatically updating the packing fulfillment plan in response to newly received order requests.

19. A non-transitory computer-readable medium storing instructions that, when executed by one or more computer processors of a robotic packing system, cause the robotic packing system to perform the operations:

processing a set of order requests and automatically setting a packing fulfillment plan process for a robotic kitting line, wherein robotic kitting line comprises a conveyor system, a plurality of operatively coupled robotic workcells arranged along the conveyor system, wherein each robotic workcell comprises at least one robotic pick-and-place machine and a set of item bins, and wherein the packing fulfillment plan is automatically set in view of the plurality of operatively coupled robotic workcells;

wherein automatically setting the packing fulfillment plan comprises:

assigning sequencing of item totes conveyed by the conveyor system, where each item tote is assigned an order request from the set of order requests, and directing distribution of item bins across the plurality of robotic workcells for progressive packing of item totes;

automatic supply loading the set of item bins at locations across the plurality of robotic workcells;

and managing operation of the robotic kitting line according to the packing fulfillment plan, which comprises:

conveying item totes through the plurality of robotic workcells, and for each item tote, progressively packing items of an order request assigned to an item tote by incrementally packing items at robotic workcells of the plurality of robotic workcells.

* * * * *